(12) United States Patent
Fujita et al.

(10) Patent No.: US 10,771,704 B2
(45) Date of Patent: Sep. 8, 2020

(54) METHOD OF DISPLAYING WIDE-ANGLE IMAGE, IMAGE DISPLAY SYSTEM, AND INFORMATION PROCESSING APPARATUS

(71) Applicant: Ricoh Company, Ltd., Tokyo (JP)

(72) Inventors: Yohei Fujita, Kanagawa (JP); Osamu Ogawara, Kanagawa (JP); Takayuki Hara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 12 days.

(21) Appl. No.: 16/160,129

(22) Filed: Oct. 15, 2018

(65) Prior Publication Data
US 2019/0132521 A1  May 2, 2019

(30) Foreign Application Priority Data
Oct. 26, 2017 (JP) .................. 2017-207636

(51) Int. Cl.
| H04N 5/232 | (2006.01) |
| G06T 3/00 | (2006.01) |
| G06K 9/20 | (2006.01) |
| H04N 21/6587 | (2011.01) |
| H04N 21/218 | (2011.01) |
| H04N 21/81 | (2011.01) |

(52) U.S. Cl.
CPC ......... *H04N 5/23293* (2013.01); *G06K 9/209* (2013.01); *G06T 3/0018* (2013.01); *H04N 5/23238* (2013.01); *H04N 21/21805* (2013.01); *H04N 21/6587* (2013.01); *H04N 21/816* (2013.01)

(58) Field of Classification Search
CPC .................. G06K 9/209; G06T 3/0018; H04N 21/21805; H04N 21/6587; H04N 21/816; H04N 5/23238; H04N 5/23293
See application file for complete search history.

(56) References Cited

U.S. PATENT DOCUMENTS

| 9,602,795 | B1* | 3/2017 | Matias | ................. G11B 27/105 |
| 2011/0234852 | A1* | 9/2011 | Ishida | .................... H04N 5/225 348/231.99 |
| 2012/0154442 | A1* | 6/2012 | Takaoka | ................. H04N 5/232 345/634 |
| 2016/0321779 | A1 | 11/2016 | Fujita | |
| 2017/0054907 | A1 | 2/2017 | Nishihara et al. | |
| 2017/0111587 | A1* | 4/2017 | Herbst | ................. H04N 5/3698 |
| 2017/0180615 | A1* | 6/2017 | Lautenbach | ......... H04N 5/2257 |
| 2017/0244946 | A1* | 8/2017 | Matias | ............... G06K 9/00744 |
| 2017/0255947 | A1 | 9/2017 | Horikawa et al. | |
| 2017/0256072 | A1 | 9/2017 | Shimmoto et al. | |
| 2017/0257576 | A1 | 9/2017 | Mitsui et al. | |
| 2018/0276722 | A1 | 9/2018 | Fujita et al. | |

FOREIGN PATENT DOCUMENTS

JP   2008-192115   8/2008

* cited by examiner

*Primary Examiner* — Amy R Hsu
(74) *Attorney, Agent, or Firm* — Xsensus LLP

(57) ABSTRACT

A method of displaying a wide-angle image including one or more attention points on a display device, the method being performed by an information processing apparatus including the display device, includes, in response to detecting a predetermined trigger when at least a part of the wide-angle image is displayed as a display region, displaying a region of the wide-angle image in the display region, the region of the wide-angle image including at least one of the one or more attention points.

18 Claims, 32 Drawing Sheets

HEMISPHERICAL IMAGE (FRONT)

HEMISPHERICAL IMAGE (BACK)

CAPTURED IMAGE (EQUIRECTANGULAR PROJECTION IMAGE)

SPHERICAL PANORAMIC IMAGE

CS

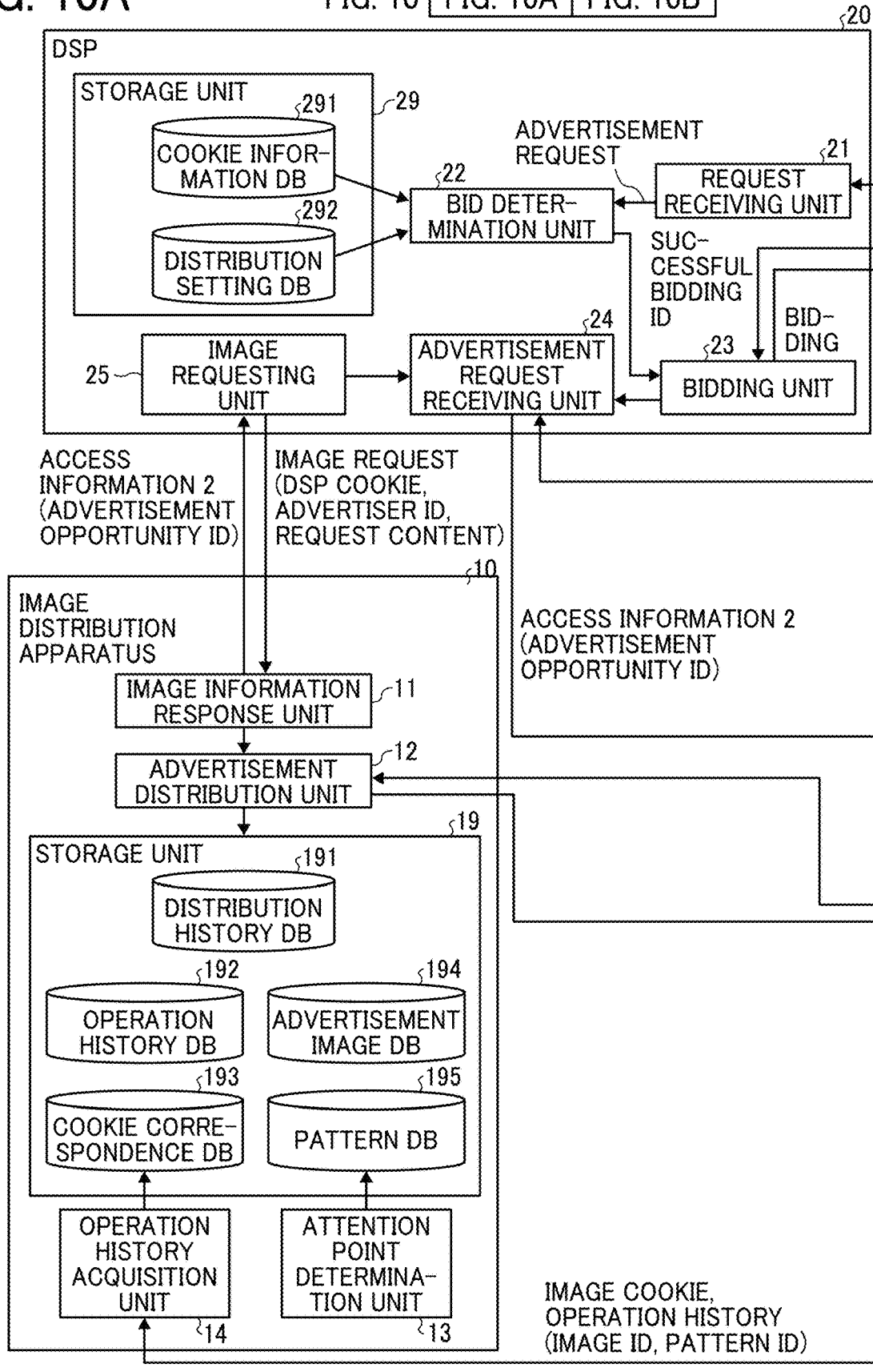

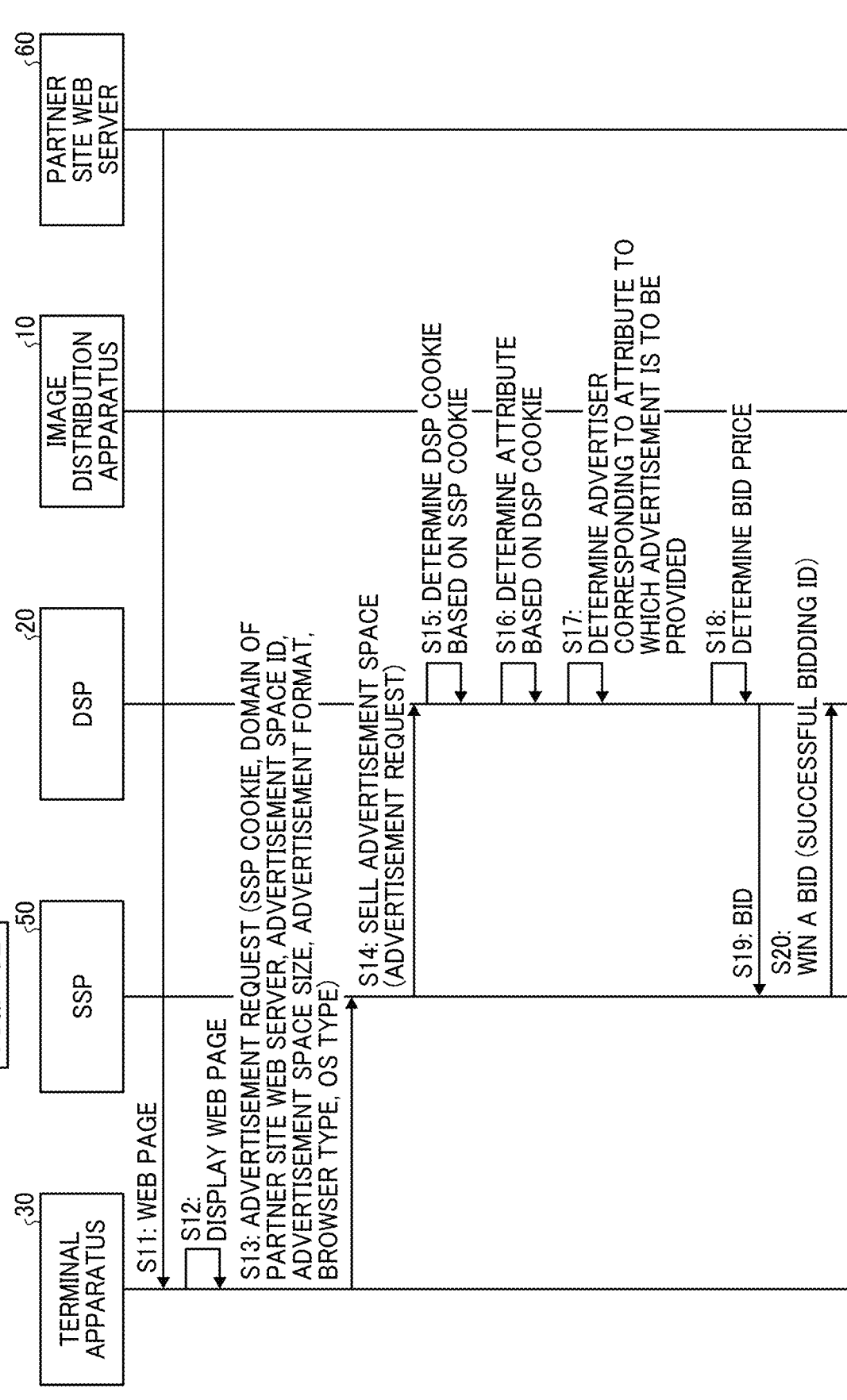

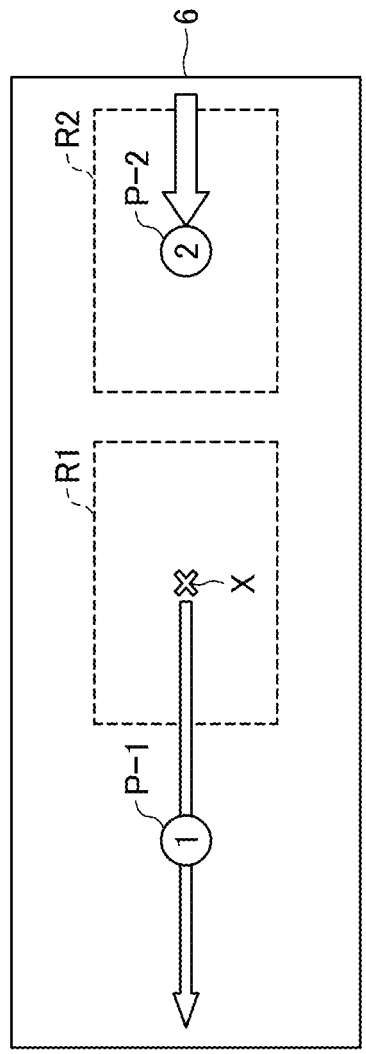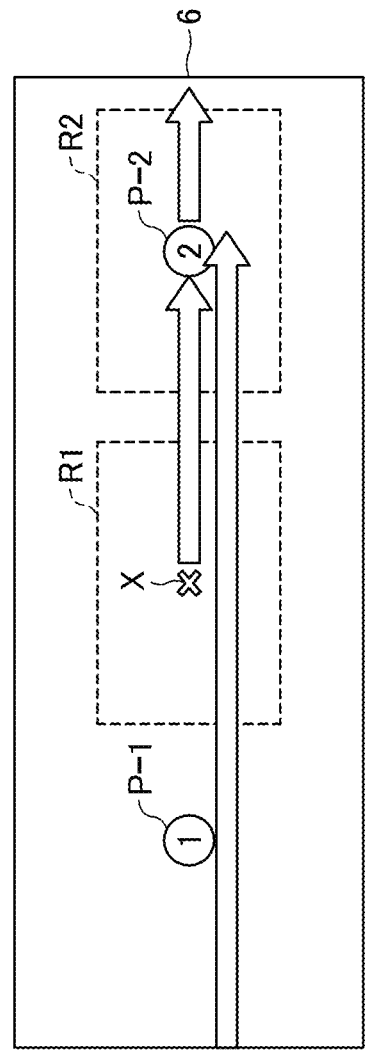

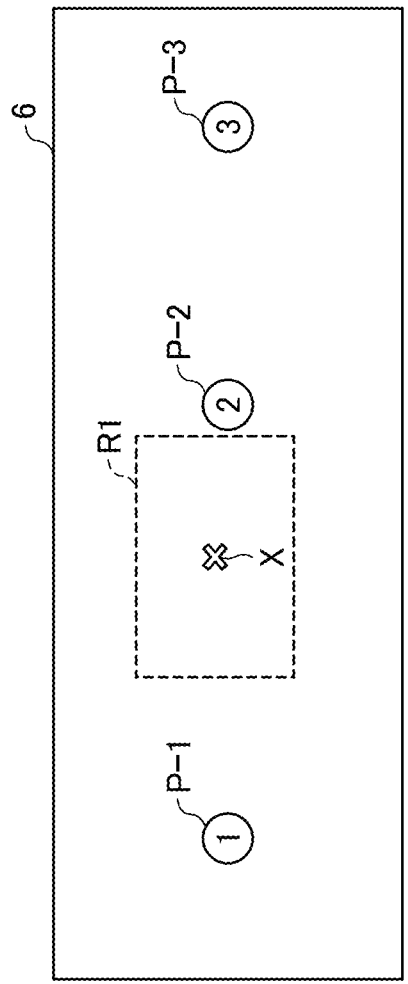
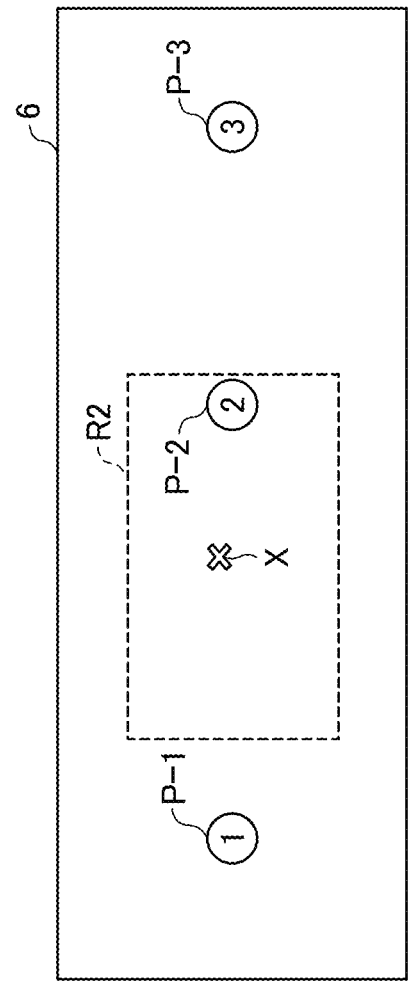
FIG. 26A
FIG. 26B

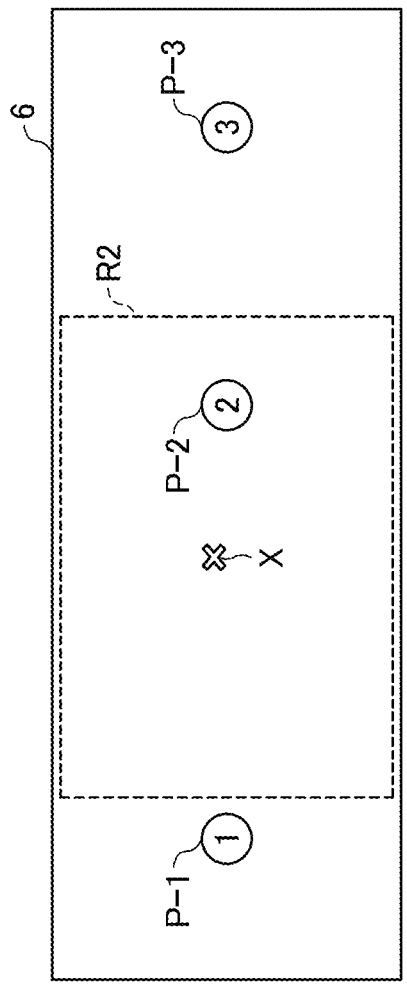
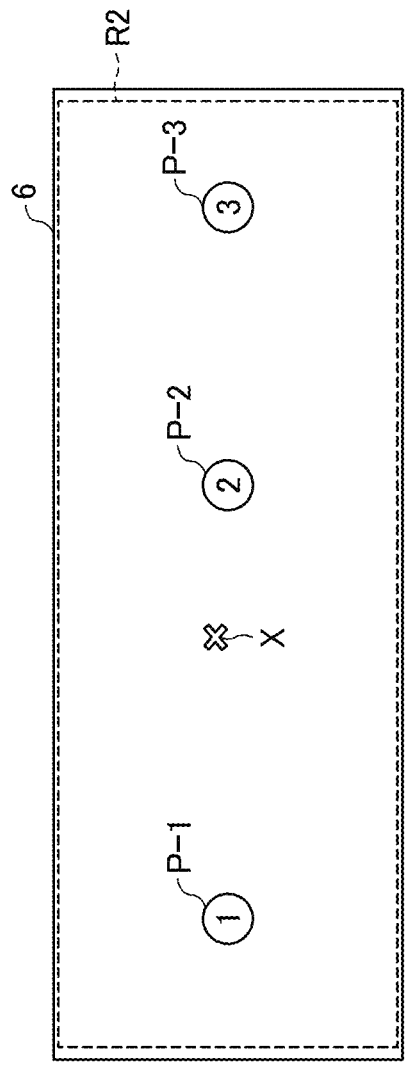

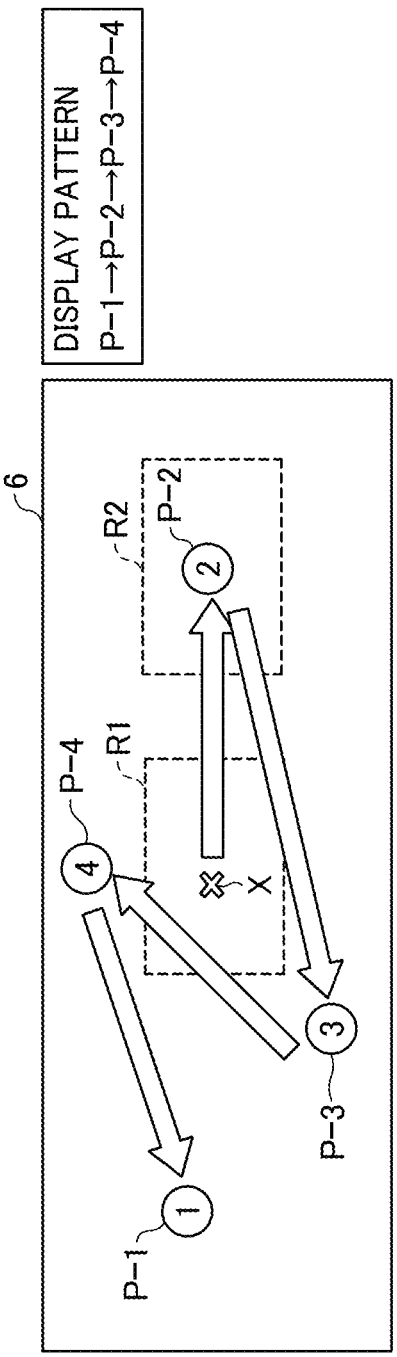

METHOD OF DISPLAYING WIDE-ANGLE IMAGE, IMAGE DISPLAY SYSTEM, AND INFORMATION PROCESSING APPARATUS

CROSS-REFERENCE TO RELATED APPLICATION

This patent application is based on and claims priority pursuant to 35 U.S.C. § 119(a) to Japanese Patent Application No. 2017-207636, filed on Oct. 26, 2017, in the Japan Patent Office, the entire disclosure of which is hereby incorporated by reference herein.

BACKGROUND

Technical Field

The present disclosure relates to a method of displaying a wide-angle image, an image display system, and an information processing apparatus.

Description of the Related Art

Compared with text data, image data is more advantageous in attracting viewers' interests. Furthermore, when the image data is a video image, the image data can contain more information than a still image. In addition, since images change in a video image, the video image attracts viewers' interests. For this reason, video images are widely used in television commercials or the like.

Further, with a wide spread of the Internet, video images are also used in web pages.

SUMMARY

A method of displaying a wide-angle image including one or more attention points on a display device, the method being performed by an information processing apparatus including the display device, includes, in response to detecting a predetermined trigger when at least a part of the wide-angle image is displayed as a display region, displaying a region of the wide-angle image in the display region, the region of the wide-angle image including at least one of the one or more attention points.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIGS. 10A and 10B are a block diagram illustrating an example of functional configurations of the terminal apparatus, an advertiser web server, a partner site web server, the image distribution apparatus, a supply-side platform (SSP), and a demand-side platform (DSP), according to an embodiment of the present disclosure;

FIGS. 13A and 13B are a sequence diagram illustrating an example of an operation of distributing the spherical image to be displayed as an advertisement, performed by the image display system, according to an embodiment of the present disclosure;

FIGS. 19A to 19E are illustrations for explaining examples of how the spherical image is rotated to display the attention point P, according to an embodiment of the present disclosure;

FIGS. 26A to 26D are illustrations for explaining an example how the attention point P is displayed only by enlargement, according to an embodiment of the present disclosure;

FIG. 28 is an illustration of an example of how the attention points P are displayed according to the display pattern, according to an embodiment of the present disclosure.

Figure 1A:
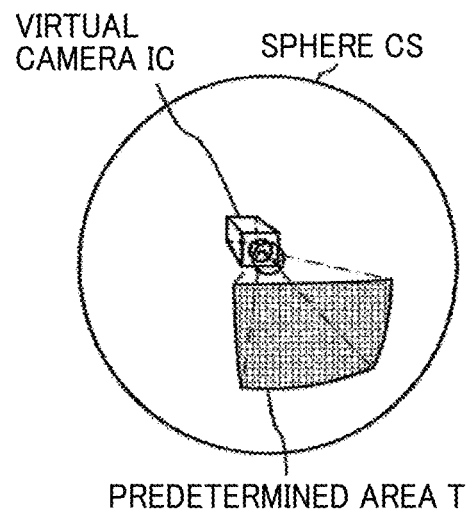
FIG. 1A and FIG. 1B are illustrations for explaining a spherical image, which is an example of a wide-angle image, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific technology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Hereinafter, a description is given of an image display system and an image display method performed by the image display system according to an embodiment of the present disclosure, with reference to the drawings.

<Overview of Operation by Image Display System>

Figure 1B:
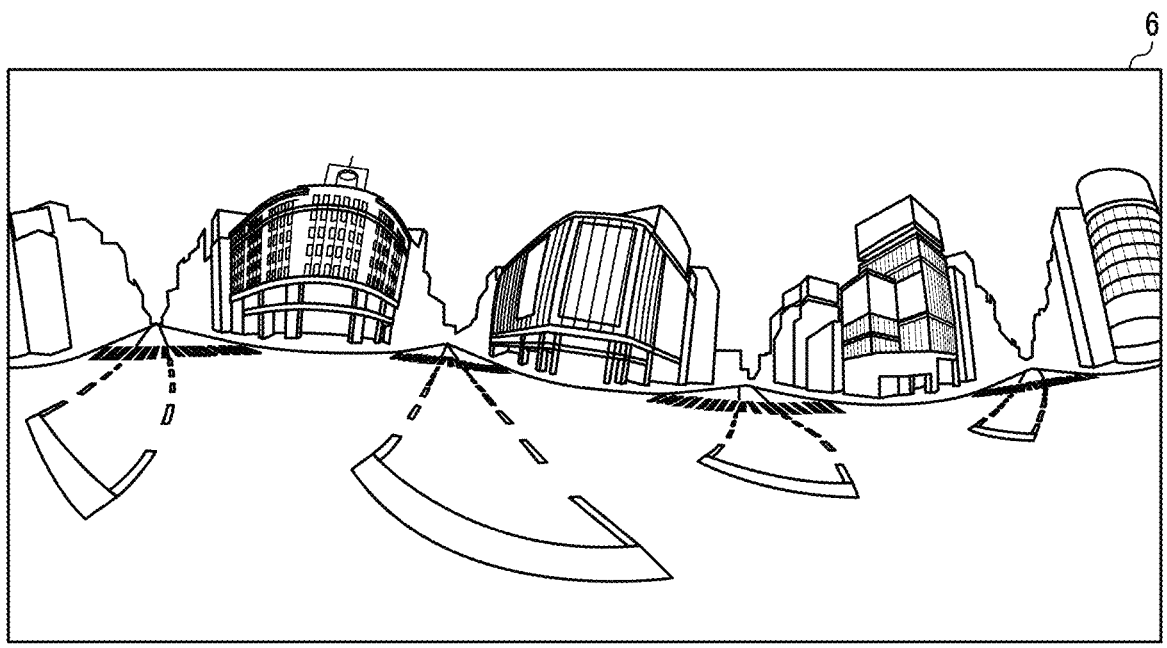

FIG. 1A and FIG. 1B are illustrations for explaining a spherical image 6, which is an example of a wide-angle image, according to the present embodiment. FIG. 1A is an illustration of the spherical image 6 represented by a three-dimensional sphere CS. FIG. 1B is an illustration of the spherical image 6 in equirectangular projection. The spherical image 6 generated by a celestial-sphere camera has a three-dimensional structure in which an image as illustrated in FIG. 1B is attached to a three-dimensional sphere CS. A virtual camera IC corresponds to a viewpoint of a viewer. In FIG. 1A, the viewpoint is positioned at the center of the spherical image 6. The viewer causes the virtual camera to rotate about each of three axes, i.e., X axis, Y axis, and Z axis, each of which passes through the virtual camera, to display a desired predetermined area of the spherical image 6. This predetermined area T is a display region. The predetermined area T can be enlarged or reduced. Among the spherical image 6, the predetermined area T that is being displayed is referred to as an "angle of view".

Figure 2A:
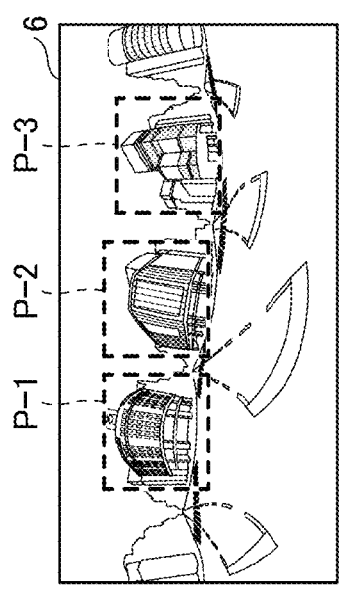
FIG. 2A and FIG. 2B are illustrations for explaining an overview of an image display system, according to an embodiment of the present disclosure.
Figure 2B:
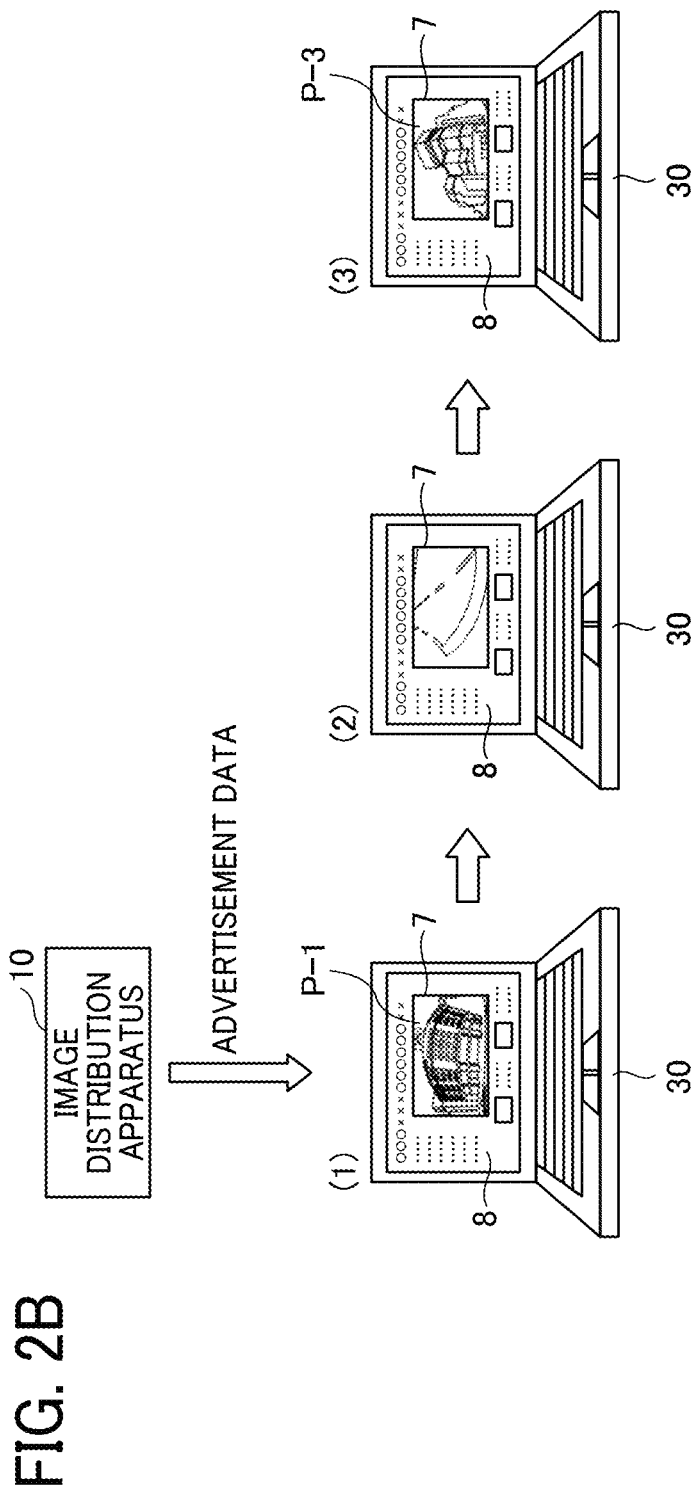

FIG. 2A and FIG. 2B are illustrations for explaining an overview of an image display system 100, according to the present embodiment. As illustrated in FIG. 2B, advertisement data is transmitted to a terminal apparatus 30. A description is given later of the advertisement data and an operation of distributing the advertisement data. The advertisement data includes a spherical image illustrated in FIG. 2A. The spherical image according to the present embodiment retains one or more attention points, and preferably further retains the angle of view of each attention point. The attention point is a center of a display region on which attention is to be focused. Specifically, the attention point is a center of a display region that a presenter of the spherical image 6 wants to be displayed, or a center of a display region that attracts much attention of one or more viewers. Alternatively, the attention point is a feature point specified by image processing, machine learning, or the like.

(1) The terminal apparatus 30 receives advertisement data from an image distribution apparatus 10. A browser 8 operating on the terminal apparatus 30 displays an attention point P that is set in advance in an advertisement space 7. The spherical image 6 of FIG. 2A has three attention points P (referred to as P-1, P-2, etc., when distinction between these points is needed) and the angle of view of each of the attention points P. In FIG. 2B, the attention point P-1 is displayed.

(2) A viewer can rotate the spherical image 6 in the up-and-down and right-and-left directions, or reduce or enlarge the spherical image 6, to cause a desired display region to be displayed. However, in some cases, the viewer causes a display region not including the attention point P to be displayed at the terminal apparatus 30. Although the viewer can display any one of attention points P by trial-and-error operation, the viewer sometimes has difficulty in causing any one of attention points P to be displayed. Further, if the display region not including the attention point P is kept displayed at the terminal apparatus 30, it is a loss of advertisement opportunity for a provider of the spherical image 6. For example, in the example of FIG. 2B, the terminal apparatus 30 that receives the advertisement data displays an image at an angle of view including the attention point P-1. The provider of the spherical image 6 wants to cause the terminal apparatus 30 to display the attention point P-2 or the attention point P-3, which are different from the attention point P-1 that is currently displayed. However, since the user can freely operate, in (2) of FIG. 2B, an area not including the attention points P-2 and P-3 is displayed. Thereafter, in (3) of FIG. 2B, an area including the attention point P-3 is displayed. However, in this case, the attention point P-2 is not displayed at the terminal apparatus 30.

(3) To address the above-described case, the terminal apparatus 30 displays the spherical image 6 so that the attention point P is included in a display region according to a preset rule, without an operation by the viewer. In other words, when the attention point P gets no longer included in the display region as a result of an operation by the viewer, the terminal apparatus 30 automatically sets the attention point P to the display region, while saving the viewer from performing an operation for determining the display region so that the attention point P is included.

Thus, the image display system 100 according to the present embodiment causes the attention point P to be displayed in a display region without manual operation. Accordingly, for example, by setting a position or a region including an image that is attractive to the viewer's interest as the attention point, an advertisement effect of an image to the viewer is enhanced. For example, a click-through rate is raised. Since the attention point P is automatically displayed in a display region, the viewer does not have to perform an operation for displaying an image of the attention point. This takes some of the load off the viewer.

<Terms Used in the Present Disclosure>

The attention point P is a part of the spherical image 6, in which a characteristic image (portion) of the spherical image 6 is included. Although the term "point" is used, the point does not have to be one pixel. For example, the "point" refers to a part (portion). For example, the attention point P is a part that is presumed to be interesting to a viewer. The attention point is determined, for example, by pure image processing. For example, a position where the same image as an image prepared in advance is displayed is specified by image processing. In another example, a part in which a predetermined subject is included is detected as the attention point. In still another example, the attention point is statistically determined based on a portion that has been actually displayed by one or more viewers.

The advertisement effect refers to at least causing a viewer to pay attention to the image. Further, clicking (or tapping) by a viewer may also be referred to as the advertisement effect.

Moving or changing a display region refers to that a part of a wide-angle image displayed in the advertisement space 7 changes. Moving or changing of a display region includes enlargement and reduction of an image. In a case where the wide-angle image is the spherical image 6, an expression like "rotating a spherical image" may be used because the spherical image 6 has a shape of a sphere.

<Example of System Configuration>

Figure 3:
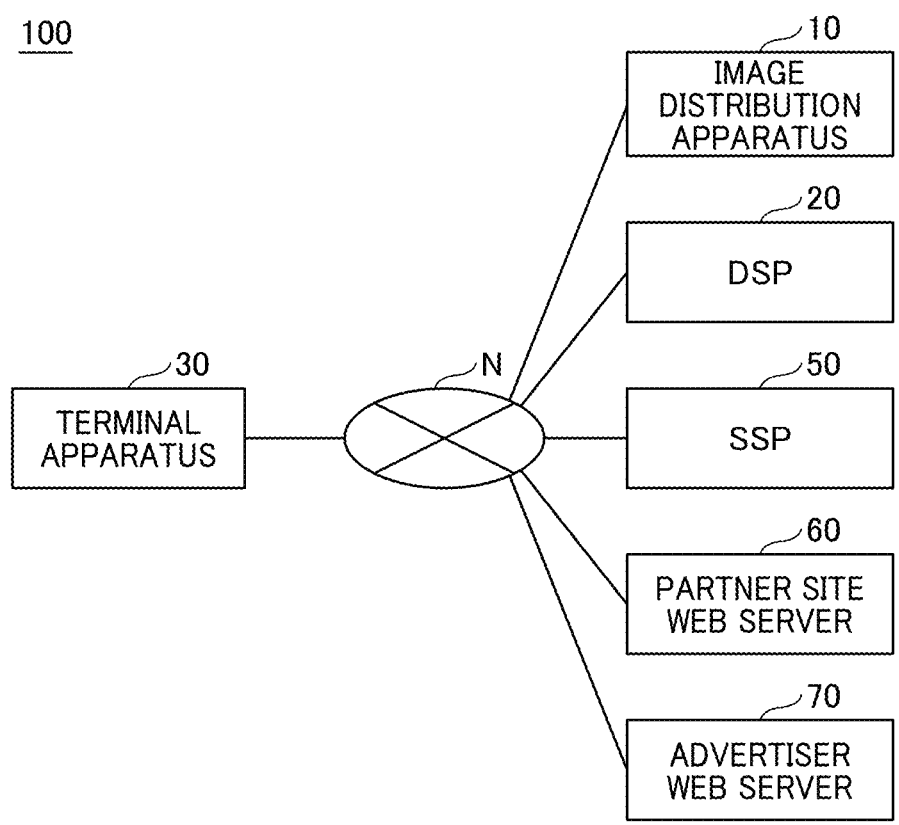
FIG. 3 is a diagram illustrating an example of a schematic configuration of the image display system, according to an embodiment of the present disclosure.

FIG. 3 is a diagram illustrating an example of a schematic configuration of the image display system 100. The image display system 100 includes the terminal apparatus 30, the image distribution apparatus 10, a demand-side platform (DSP) 20, a supply-side platform (SSP) 50, a partner site web server 60, and an advertiser web server 70, which are communicable with each other via a network N.

The network N is implemented by, for example, a local area network (LAN) provided in an institution or the like where the terminal apparatus 30 is located, a provider network of a provider that connects the LAN to the Internet, and a line provided by a carrier. The network N may have a plurality of LANs or may be called a wide area network (WAN). Further, the network N includes the Internet. The network N can be any one of a wired network, a wireless network, and a combination thereof. When the terminal apparatus 30 directly connects to a public network, the terminal apparatus 30 connects to the provider network without intervening the LAN.

The terminal apparatus 30 is an information processing apparatus that operates as a client terminal in the present embodiment. In the terminal apparatus 30, the browser 8 or application software having functions equivalent to the browser 8 is operating. The browser 8 or the equivalent application software receives, from a partner site web server 60, a web page requested by the terminal apparatus 30 and displays the received web page on a display (a display 315 described later).

Examples of the terminal apparatus 30 include a personal computer (PC), a tablet apparatus, a smartphone, a personal digital assistant, a game machine, a navigation terminal, and a wearable PC. Further, the terminal apparatus 30 can be any other suitable apparatus, device or machine, provided that it can displays a web page. For example, a printer can be used as the terminal apparatus 30, provided that it has a function of displaying a web page or a display. Further, a digital signage can display the web page received from the partner site web server 60. Digital signage refers to a system or a device that disseminates information using an electronic display device such as a display in a place where people may walk or exist, such as outdoors, store fronts, public spaces, or transportation facilities. Further, digital signage also refers to information displayed on such system or device. In the present embodiment, it is assumed that a web application is included in the web page. A web application refers to software used on a web browser. The web application is implemented by a cooperation between a program written in a programming language such as JavaScript (registered trademark) that operates on a browser and a program provided by a web server. Further, the web application refers to a mechanism that implements such software.

In one example, the terminal apparatus 30 connects to the network N via an access point of a wired LAN or a wireless LAN. In another example, the terminal apparatus 30 connects to the network N by communication of a switching circuit type, such as 3G, 4G and Long Term Evolution (LTE).

The partner site web server 60 is a server (general-purpose information processing apparatus) that provides information and functions to a client computer (the terminal apparatus 30 of this embodiment) used by a viewer through a network. A web page provided by the advertiser web server 70 includes the advertisement space 7. The partner site web server 60 requests the SSP 50 to display an advertisement in the advertisement space The advertiser web server 70 is also a server (general-purpose information processing apparatus) that provides information and functions to a client computer (the terminal apparatus 30 of the present embodiment) used by a viewer through a network. When the viewer clicks (or taps) the advertisement space 7, the terminal apparatus 30 accesses the advertiser web server 70. The advertiser web server 70 is provided by an advertiser. The advertiser web server 70 requests the DSP 20 to purchase the advertisement space 7 in which an advertisement of the advertiser's own product or service is to be displayed. Further, the advertiser web server 70 requests the image distribution apparatus 10 to generate an advertisement and display the advertisement.

The advertiser web server 70 and the partner site web server 60 communicate with the terminal apparatus 30 using a communication protocol of HTTP or HTTPs, for example. In response to a request from the terminal apparatus 30, the advertiser web server 70 and the partner site web server 60 transmit screen information to the terminal apparatus 30. The screen information is a program written in a HyperText Markup Language (HTML), a script language, and a cascading style sheet (CSS). The HTML mainly defines a structure of a web page. The script language defines an operation of the web page. The CSS defines a style of the web page. In the present embodiment, the script language updates the spherical image 6 to reflect an operation by the viewer performed to the web page. Specifically, a program language called JavaScript (registered trademark) or ECMAScript is known as a script language. A script is one type of program, and also referred to as software.

Both the advertiser web server 70 and the partner site web server 60 record cookies in the terminal apparatus 30. The advertiser web server 70 records both a cookie of its own company and a cookie of the DSP 20. The partner site web server 60 records both a cookie of its own company and a cookie of the SSP 50.

The SSP 50 is a mechanism for maximizing revenue obtained by selling the advertisement space 7 by the partner site web server 60 that provides the advertisement space 7. Although in FIG. 3, the SSP 50 is illustrated as a single apparatus, the SSP 50 is constituted as a network of one or more information processing apparatuses. The partner site web server 60 requests the SSP 50 to sell the advertisement space 7. Specifically, an advertisement tag issued by the SSP 50 is described in the advertisement space 7. When the terminal apparatus 30 displays a web page of the partner site web server 60, the advertisement tag requests the SSP 50 for distribution of an advertisement (advertisement request). The SSP 50 receives a bid for the advertisement space 7 from the DSP 20 and transmits to the terminal apparatus 30 access information 1 using which the terminal apparatus 30 accesses the DSP 20 that wins a bid. A description of the access information 1 is provided below.

The DSP 20 is a mechanism for performing an efficient and effective advertisement distribution for advertisers, such as purchase of advertisement space 7 and advertisement distribution. Although in FIG. 3, the DSP 20 is illustrated as a single apparatus, the DSP 20 is constituted as a network of one or more information processing apparatuses. Specifically, the DSP 20 acquires, from the SSP 50, an SSP cookie, etc., retained by the terminal apparatus 30 operated by a viewer. The DSP 20 determines an attribute and the like of the viewer based on correspondence information between DSP cookies and SSP cookies. The correspondence information is managed by the DSP 20 itself. Further, the DSP 20 determines a bid price based on an advertisement distribution setting provided an advertiser, who makes a request based on an attribute of a viewer or a budget, and submits a bid to the SSP 50 with the determined price.

The DSP 20 which wins a bid is requested for an advertisement from the terminal apparatus 30 using the access information 1. The DSP 20 notifies the image distribution apparatus 10 of the advertisement request. Further, the DSP 20 acquires, from the image distribution apparatus 10, access information 2 based on which the terminal apparatus 30 requests the image distribution apparatus 10 for advertisement data. A description of the access information 2 is provided below. The advertisement data includes the spherical image 6, a display program for displaying the spherical image 6, and an operation history program for acquiring an operation history.

The DSP 20 transmits the access information 2 to the terminal apparatus 30. The DSP 20 charges a fee to the advertiser according to a contract. Further, a fee is charged according to a contract between the image distribution apparatus 10 and the advertiser. However, depending on the contract, a fee may or may not be charged only by displaying an advertisement.

The image distribution apparatus 10 is one or more information processing apparatuses that provide the advertisement space 7 purchased by the DSP 20 with advertisement data including an advertisement material (spherical image 6) optimum for attributes of a viewer. The image distribution apparatus 10 holds manuscript materials such as banners and text, and advertisement images. In one example, the advertisement data is simply a banner (an image formed of characters, photographs or drawings). In another example, the advertisement data includes a script language, in addition to the image. In the present embodiment, the advertisement data includes a display program and an operation history program. The display program is a program for causing the attention point P in the spherical image 6 to be displayed or for updating a display mode of the spherical image 6 to reflect an operation to the spherical image 6 performed by a viewer. The operation history program is a program for recording a history of operations (referred to as "operation history" hereinafter) performed to the spherical image 6. Both the display program and the operation history program are written in a script language.

Distribution of images for advertisement by the image distribution apparatus 10 is referred to as "third-party ad serving". Third-party ad serving is a mechanism for distributing advertisements across multiple media in order to manage an entire campaign on an advertiser side. The third-party ad server controls distribution frequency of advertisement or measures an effect of advertisement, for example. The image distribution apparatus 10 corresponds to the third-party ad server.

When the terminal apparatus 30 requests the image distribution apparatus 10 for the advertisement data based on the access information 2, the image distribution apparatus 10 transmits the advertisement data to the terminal apparatus 30. The advertisement data includes the spherical image 6. The display program automatically rotates, enlarges or reduces the spherical image 6 so that the attention point P of the spherical image 6 is displayed. Further, the operation history program transmits, to the image distribution apparatus 10, the operation history indicating operations performed on the spherical image 6, together with a cookie of the image distribution apparatus 10 (referred to as an "image cookie" in order to distinguish from other cookies) and an image ID. The operation history is information indicating which viewing angle of view has been displayed or clicked, for example. This operation history is used for determining the attention point P.

In addition, the operation history program transmits, to the image distribution apparatus 10, information indicating that clicking has been performed together with a pattern ID of a display pattern. A description of the display pattern is provided below. The image distribution apparatus 10 defines a plurality of display patterns for one spherical image 6. The image distribution apparatus 10 monitors a click-through rate of each of the display patterns, to distribute the display pattern having a high click-through rate.

<Example of Hardware Configuration>

Figure 4:
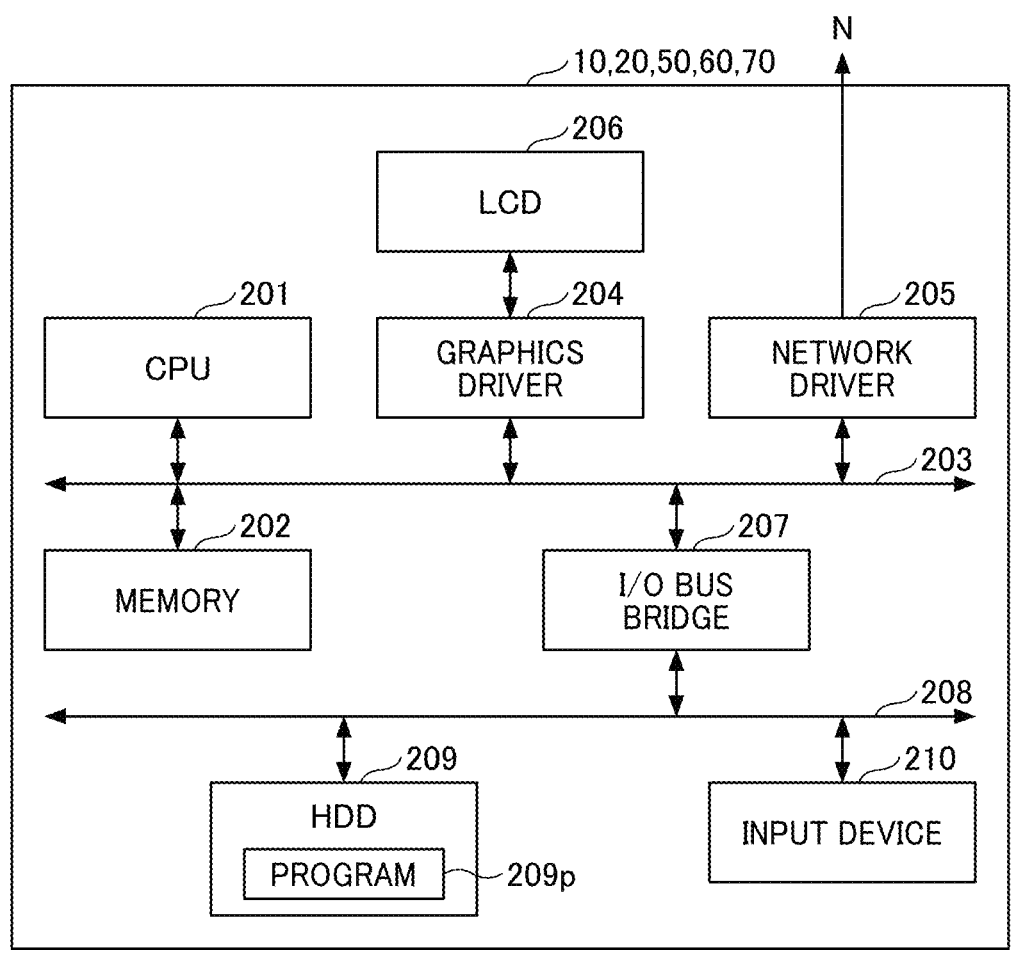
FIG. 4 is a block diagram illustrating an example of a schematic hardware configuration of an image distribution apparatus, according to an embodiment of the present disclosure.

FIG. 4 is a block diagram illustrating an example of a schematic hardware configuration of the image distribution apparatus 10. The image distribution apparatus 10 can be implemented as a general-purpose personal computer, a workstation, or an appliance server. The image distribution apparatus 10 includes a central processing unit (CPU) 201 and a memory 202 that enables the CPU 201 to access data to be used at high speed. The CPU 201 and the memory 202 are connected to other devices or drivers of the image distribution apparatus 10, for example, a graphics driver 204 and a network driver (NIC) 205, via a system bus 203.

The graphics driver 204 is connected to a liquid crystal display (LCD) 206 via a bus. The graphics driver 204 monitors a result of processing by the CPU 201. In one example, a touch panel is arranged on the LCD 206, such that the touch panel and the LCD 206 is configured as a single unit. In this case, the viewer can operate the image distribution apparatus 10 with his/her finger as an operation tool.

Further, the network driver 205 connects the image distribution apparatus 10 to the network N at a transport layer level and a physical layer level to establish a session with the advertiser web server 70 or the terminal apparatus 30, for example.

An input output (I/O) bus bridge 207 is further connected to the system bus 203. On the downstream side of the I/O bus bridge 207, a storage device such as a hard disc drive (HDD) 209 is connected via an I/O bus 208 such as a peripheral component interconnect (PCI), in compliance with the Integrated Drive Electronics (IDE), Advanced Technology Attachment (ATA), AT Attachment Packet Interface (ATAPI), serial ATA, Small Computer System Interface (SCSI), Universal Serial Bus (USB), etc. The image distribution apparatus 10 can include a solid state drive (SSD) instead of or in addition to the HDD 209.

The HDD 209 stores a program 209p for controlling entire operation of the image distribution apparatus 10. An input device 210 such as a keyboard and a mouse (called a pointing device) is connected to the I/O bus 208 via a bus such as a USB.

Each of the advertiser web server 70, the partner site web server 60, the SSP 50, and the DSP 20 has the same or substantially the same hardware configuration as that of the image distribution apparatus 10 as illustrated in FIG. 4. Even when the hardware configuration of each of the advertiser web server 70, the partner site web server 60, the SSP 50, and the DSP 20 can be different from that of the image distribution apparatus, a description of the present embodiment is given under the assumption that such differences are insignificant. It is preferable that each of the advertiser web server 70, the partner site web server 60, the DSP 20, and the image distribution apparatus 10 supports cloud computing. "Cloud computing" refers to computing where resources on a network are used or accessed without identifying specific hardware resources. In this case, the hardware configuration illustrated in FIG. 4 is not necessarily housed in one housing nor provided as apparatus of one unit. In other words, the hardware configuration illustrated in FIG. 4 indicates hardware elements preferably included in the advertiser web server 70, the partner site web server 60, the DSP 20, and the image distribution apparatus 10.

Figure 5:
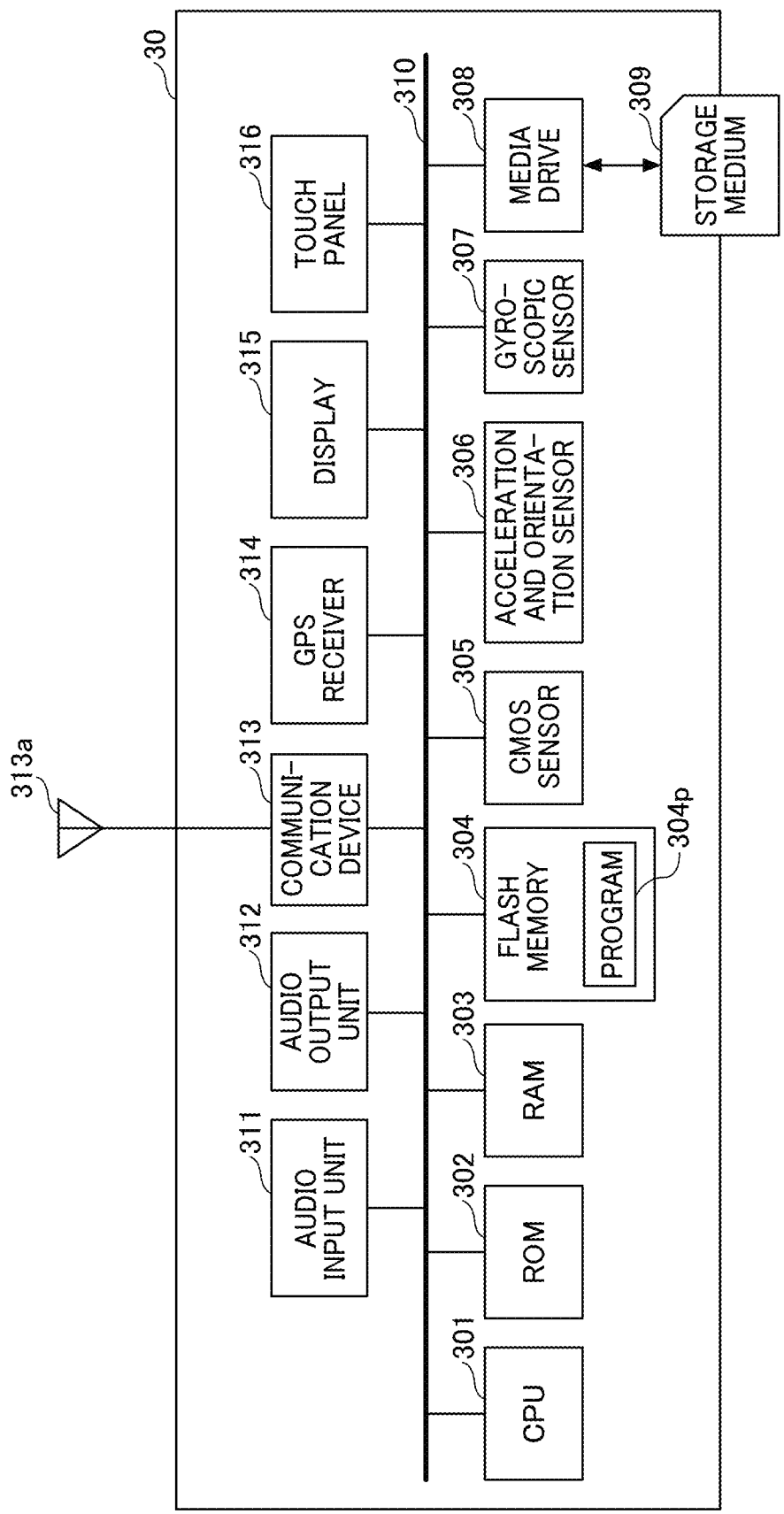
FIG. 5 is a block diagram illustrating an example of a hardware configuration of a terminal apparatus, according to an embodiment of the present disclosure.

FIG. 5 is a block diagram illustrating an example of a hardware configuration of the terminal apparatus 30. In FIG. 5, a hardware configuration is illustrated on assumption that the terminal apparatus 30 is a smartphone or a tablet apparatus. However, as described above, the terminal apparatus 30 can be any other suitable apparatus or device than a smartphone and a tablet apparatus. Accordingly, the terminal apparatus 30 can have a hardware configuration different from that illustrated in FIG. 5.

The terminal apparatus 30 includes a CPU 301, a read only memory (ROM) 302, a random access memory (RAM) 303, a flash memory 304, a complementary metal oxide semiconductor (CMOS) sensor 305, an acceleration and orientation sensor 306, a gyroscopic sensor 307, a media drive 308, an audio input unit 311, an audio output unit 312, a communication device 313, a global positioning system (GPS) receiver 314, a display 315, and a touch panel 316, which are connected with each other via a bus 310. The bus 310 is an address bus or a data bus, which electrically connects those hardware components.

The CPU 301 executes a program 304p stored in the flash memory 304 to control entire operation of the terminal apparatus 30. The ROM 302 stores an initial program loader (IPL) and a basic input/output program. The RAM 303 is a main memory used as a work area when the CPU 301 executes a program. The flash memory 304 is a nonvolatile memory that stores programs executed by the terminal apparatus 30 and various data. The program 304p includes, for example, an operating system, the browser 8, and screen information transmitted from the advertiser web server 70, etc. The terminal apparatus 30 executes the browser 8 and the display program and the operation history program included in the screen information.

The CMOS sensor 305 is an imaging element that captures an object under control of the CPU 301 to obtain image data. Instead of the CMOS sensor 305, charge-coupled device (CCD) sensor can be used. The acceleration and orientation sensor 306 has a function as an electromagnetic compass for detecting geomagnetism and a function for measuring accelerations in three axial directions. The gyroscopic sensor 307 detects angular velocity of the terminal apparatus 30 when the terminal apparatus 30 rotates with respect to the x axis, y axis, or the z axis. The rotation angle of each axis is called yaw angle, pitch angle, and roll angle.

The media drive 308 controls reading or writing (storing) of data from and to a storage medium 309 such as a flash memory. The storage medium 309 is removably mounted to the media drive 308. Under control of the media drive 308, data stored in the storage medium 309 is read from the storage medium 309 and new data is written (stored) into the storage medium 309.

The audio input unit 311 is implemented by, for example, a microphone, which converts sound into an audio signal. The audio output unit 312 is implemented by, for example, a speaker, which converts an audio signal into sound. The communication device 313 communicates with a nearest base station apparatus by radio communication signals using the antenna 313a. In another example, the communication device 313 is a LAN card connected to the LAN. The GPS receiver 314 detects position information (latitude, longitude, and altitude) of the terminal apparatus 30 with GPS satellites or an indoor Messaging system as indoor GPS.

The display 315 is a display device that, under control of the CPU 301 displays a spherical image or displays various menus, icons and the like that allow a user to operate the terminal apparatus 30. The touch panel 316 is arranged on the display 315, such that the touch panel 316 and the display 315 is configured as a single unit. The touch panel 316 detects a position (coordinates) on the display 315 touched by a finger, a stylus, or the like.

<Spherical Image>

Figure 6:
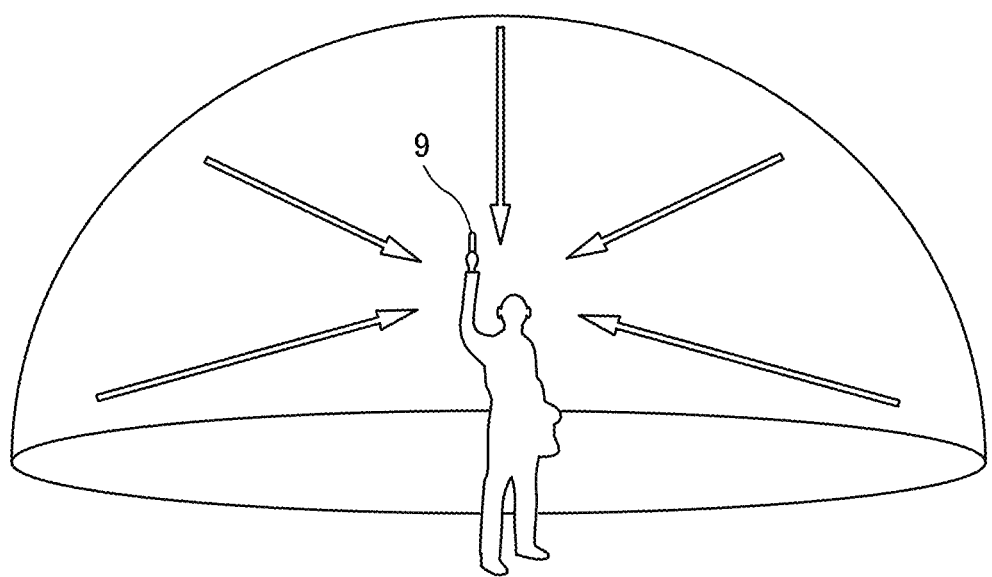
FIG. 6 is an illustration of an example of how a user uses a celestial-sphere camera, according to an embodiment of the present disclosure.

Hereinafter, a description is given of the spherical image 6, with reference to FIGS. 6 to 9. FIG. 6 is an illustration of an example of how a user uses the celestial-sphere camera 9. As illustrated in FIG. 6, the celestial-sphere camera 9 is used for capturing objects surrounding the user who is holding the celestial-sphere camera 9 in his or her hand. The celestial-sphere camera 9 has a structure in which the back faces of two imaging elements are opposed to each other. Each of the imaging elements captures an image of objects surrounding the user, thereby obtaining two hemispherical images.

Figure 7A:
FIGS. 7A to 7C are illustrations for explaining an overview of an operation of generating a spherical image from images captured by the celestial-sphere camera, according to an embodiment of the present disclosure.
Figure 7B:
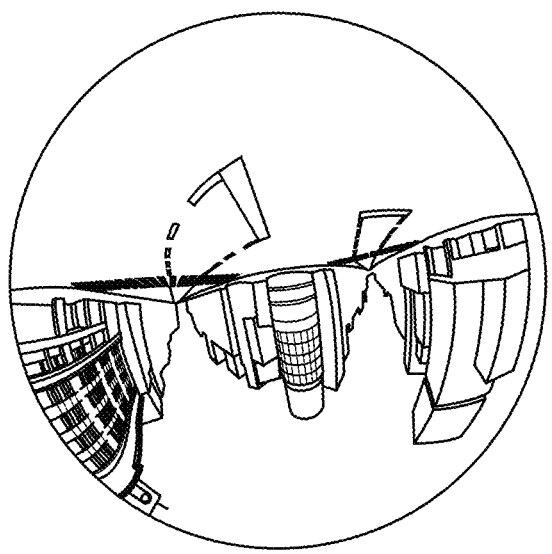
Figure 7C:
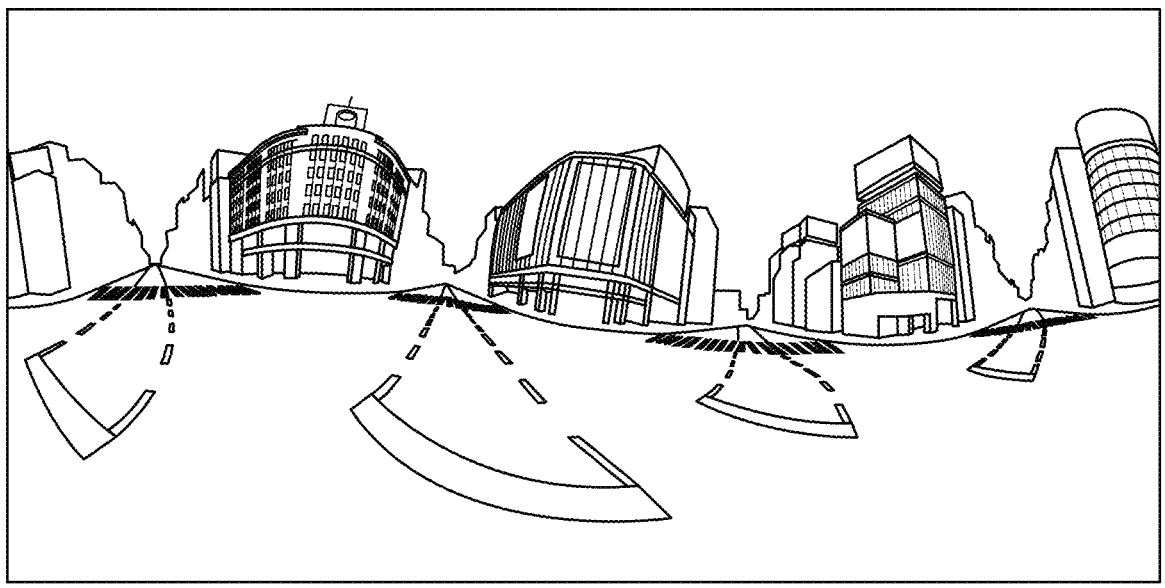
Figure 8B:
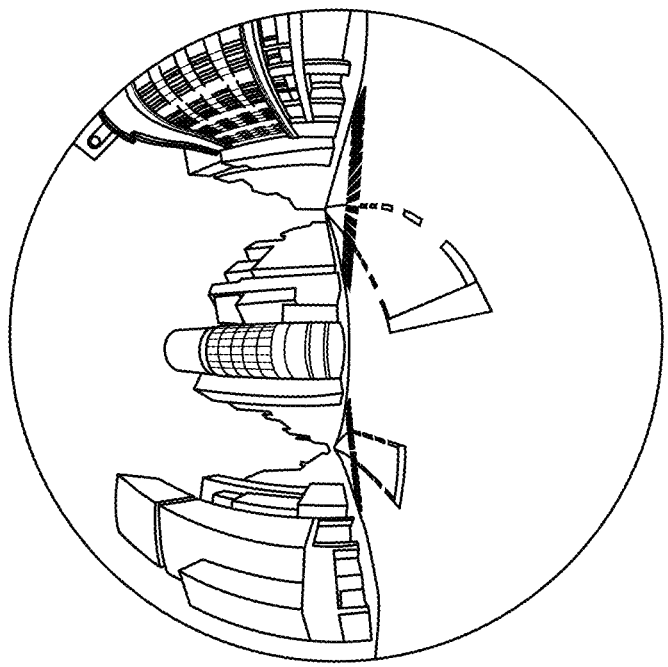
FIGS. 8A and 8B are illustrations for explaining an overview of an operation of generating a spherical image from images captured by the celestial-sphere camera, according to an embodiment of the present disclosure.
Figure 8A:
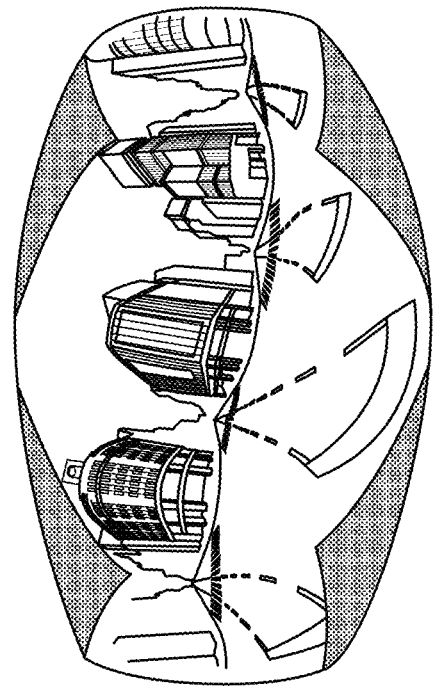
Figure 8A:
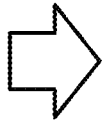
Figure 8A:
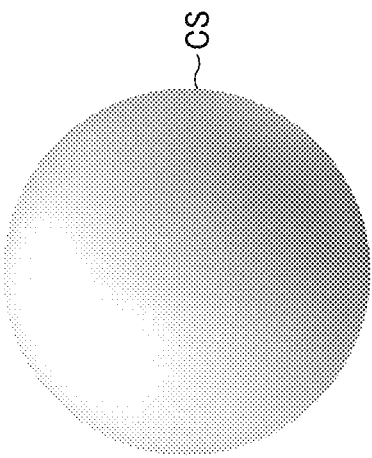

Next, a description is given of an overview of an operation of generating the spherical image 6 from the images captured by the celestial-sphere camera 9, with reference to FIGS. 7A to 7C and FIGS. 8A and 8B. FIG. 7A is a view illustrating a front side of a hemispherical image captured by the celestial-sphere camera 9. FIG. 7B is a view illustrating a back side of a hemispherical image captured by the celestial-sphere camera 9. FIG. 7C is a view illustrating an image in equirectangular projection, which is hereinafter referred to as an "equirectangular projection image". FIG. 8A is a conceptual diagram illustrating an example of how the equirectangular projection image maps to a surface of a sphere. FIG. 8B is a view illustrating the spherical image 6.

As illustrated in FIG. 7A, an image captured by the celestial-sphere camera 9 is a curved hemispherical image (front side) taken through a fisheye lens. Further, as illustrated in FIG. 7B, an image captured by the celestial-sphere camera 9 is a curved hemispherical image (back side) taken through a fisheye lens. The hemispherical image (front side) and the hemispherical image (back side), which is reversed by 180-degree, are combined by the celestial-sphere camera 9. This results in generation of the equirectangular projection image as illustrated in FIG. 7C.

The equirectangular projection image is mapped on the sphere surface using Open Graphics Library for Embedded Systems (OpenGL ES) as illustrated in FIG. 8A. This results in generation of the spherical image 6 as illustrated in FIG. 8B. In other words, the spherical image 6 is represented as the equirectangular projection image, which corresponds to a surface facing a center of the sphere. OpenGL ES is a graphic library used for visualizing two-dimensional (2D) and three-dimensional (3D) data. The spherical image 6 is either a still image or a video image.

The advertisement data distributed by the image distribution apparatus 10 includes the spherical image 6. Since the spherical image 6 is an image mapped to the sphere surface, the spherical image 6 is curved. For this reason, one may feel strange viewing the spherical image 6. To resolve this strange feeling, the terminal apparatus 30 display an image of a predetermined area T, which is a part of the spherical image 6, as a planar image having fewer curves. The predetermined area T is indicated by coordinates (X, Y, Z) in a three-dimensional virtual space. On the other hand, since the display 315 is a two-dimensional plane, the terminal apparatus 30 cannot display the predetermined area T without modification. To address this issue, the terminal apparatus 30 converts the predetermined area T into a display region by perspective projection transformation by which a three-dimensional object is projected onto a two-dimensional plane by using the three-dimensional computer graphic technique. As a result, the predetermined area T of the spherical image 6 as illustrated in FIG. 1A is displayed on the display 315 as the display region.

Figure 9:
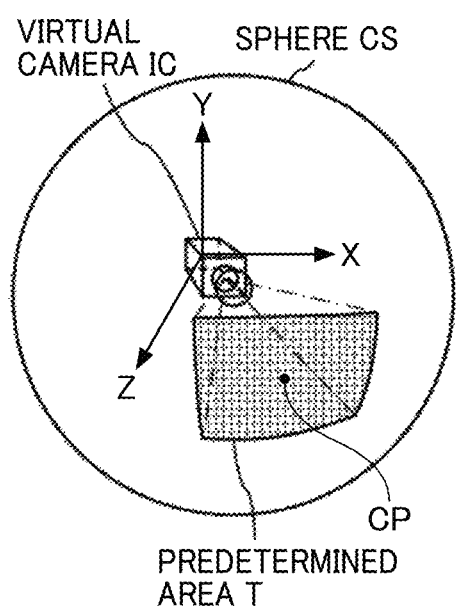
FIG. 9 is an illustration for explaining a line of sight of a viewer, according to an embodiment of the present disclosure.

FIG. 9 is an illustration for describing a line of sight of a viewer. Since the spherical image 6 has three-dimensional coordinates, a direction of line of sight is identified by information specifying coordinates in a sphere, such as coordinates in the three-dimensional space or the latitude and longitude in the three-dimensional space. In the present embodiment, a center cp of the predetermined area T is set as the direction of line of sight.

The viewer can change the direction of line of sight by operation. When it is assumed that the virtual camera IC does not move in a parallel direction, the virtual camera IC can rotate as a rigid body in three ways, that is, roll (rotation about the Z axis), yaw (rotation about the Y axis), and pitch (rotation about the X axis). When any of these three rotations occurs, the direction of line of sight changes. For example, when the viewer rotates the spherical image 6 in a horizontal direction, the yaw angle changes. When the viewer rotates the spherical image 6 in a vertical direction, the pitch angle changes. When the viewer rotates the spherical image 6 about a center (direction of the line of sight) of the display 315, the roll angle changes. In the present embodiment, the direction of line of sight (roll angle, yaw angle, and pitch angle) is updated to reflect an operation performed to a web page by the viewer. The display program includes descriptions in advance as to how the operation is reflected on the direction of line of sight.

The viewer can change the direction of the line of sight by flicking or swiping the touch panel. In addition, the viewer can also change the direction of the line of sight by moving the terminal apparatus 30 so that angular velocity or acceleration is generated in the terminal apparatus 30. The angular velocity is detected by the gyroscopic sensor 307, and the acceleration is detected by the acceleration and orientation sensor 306.

<Functions>

Figure 10B:
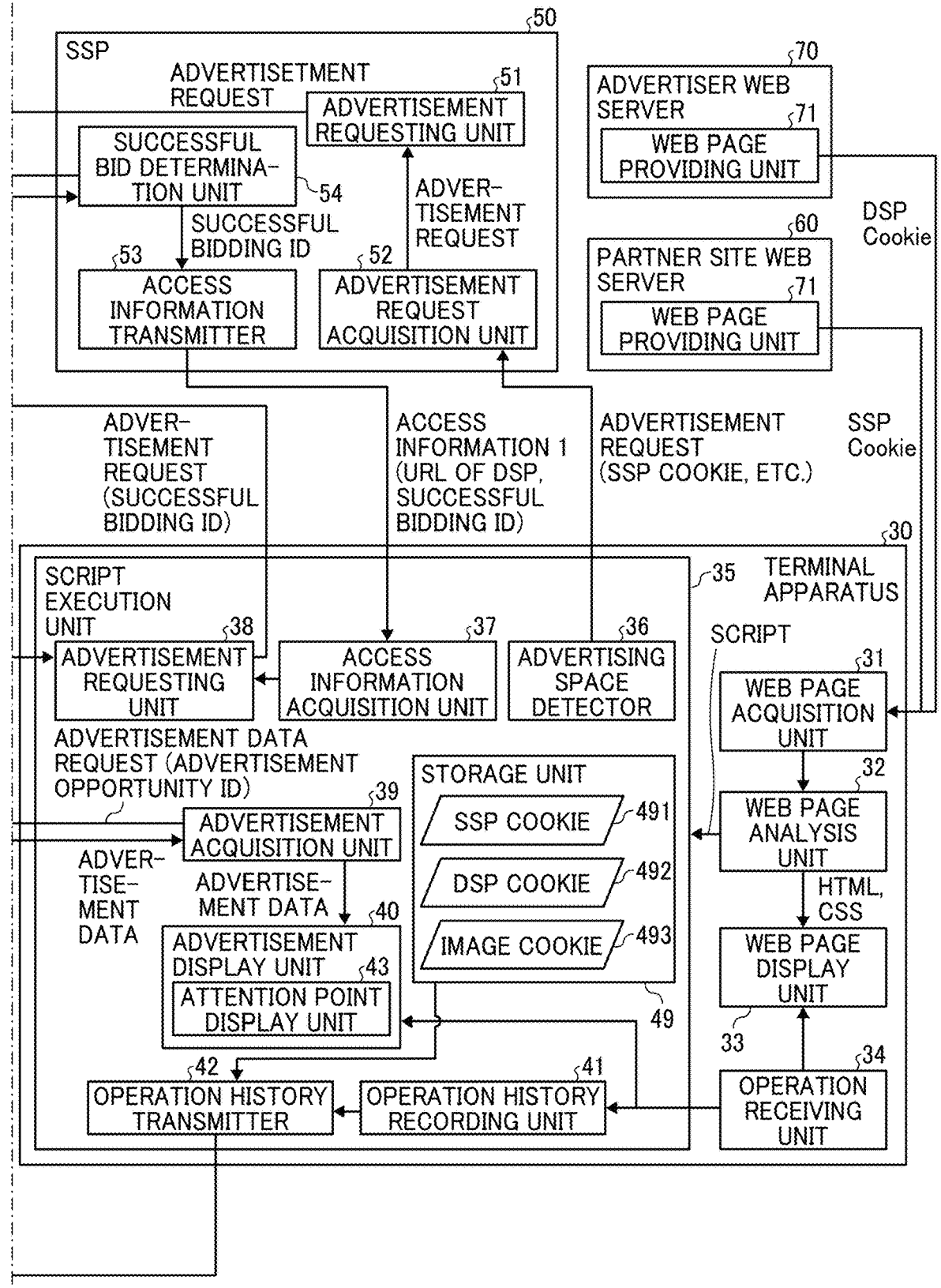

FIGS. 10A and 10B are block diagrams illustrating an example of functional configurations of the terminal apparatus 30, the advertiser web server 70, the partner site web server 60, the image distribution apparatus 10, the SSP 50, and the DSP 20.

<<Functional Configuration of Advertiser Web Server 70 and Partner Site Web Server 60>>

The advertiser web server 70 and the partner site web server 60 have a web page providing unit 71. These functions of the advertiser web server 70 and the partner site web server 60 are functions or means implemented by the CPU 201 executing the program 209p that is loaded from the HDD 209 onto the memory 202 illustrated in FIG. 4.

The web page providing unit 71 interprets a HTTP request from the terminal apparatus 30 to construct a web page. The web page providing unit 71 transmits the web page to the terminal apparatus 30 as an HTTP response. If necessary for processing, the web page providing unit 71 requests an application server to perform the processing, arranges the processing result on the web page, and transmits the web page. The web page of the advertiser web server 70 includes an advertiser's cookie and a DSP cookie. This is because the advertiser web server 70 requests the DSP 20 to distribute advertisements. This implements retargeting ads and the like. The web page of the partner site web server 60 includes a partner site cookie and an SSP cookie. This is because the partner site web server 60 requests the SSP 50 to sell the advertisement space 7.

<<Functions of SSP 50>>

The SSP 50 includes an advertisement requesting unit 51, an advertisement request acquisition unit 52, an access information transmitter 53, and a successful bid determination unit 54. These functions of the SSP 50 are functions or means implemented by the CPU 201 executing the program 209p loaded from the HDD 209 onto the memory 202.

The advertisement request acquisition unit 52 acquires an advertisement request including an SSP cookie from the terminal apparatus 30 executing an advertisement tag associated with the advertisement space 7. The advertisement request acquisition unit 52 sends the advertisement request including the SSP cookie to the advertisement requesting unit 51.

The advertisement requesting unit 51 transmits the advertisement request to the DSP 20. The advertisement request includes the SSP cookie, a domain of the partner site web server 60, an advertisement space ID, an advertisement space size, an advertisement format, a browser type, and an operating system (OS) type.

The successful bid determination unit 54 receives bids from the DSP 20 and performs an auction for selling the advertisement space 7 basically to the DSP 20 that offers the highest bid price. The successful bid determination unit 54 receives no bid depending on the advertiser's products or services. The successful bid determination unit 54 generates a successful bidding ID and transmits the successful bid ID to the DSP 20.

The access information transmitter 53 generates the access information 1 using which the terminal apparatus 30 transmits an advertisement request to the DSP 20. The access information transmitter 53 transmits the generated access information 1 to the terminal apparatus 30 together with the successful bid ID. The access information 1 includes an URL (IP address) of the DSP 20.

<<Functions of DSP 20>>

The DSP 20 includes a request receiving unit 21, a bid determination unit 22, a bidding unit 23, an advertisement request receiving unit 24, and an image requesting unit 25. These functions of the DSP 20 are functions or means implemented by the CPU 201 executing the program 209$p$ loaded from the HDD 209 onto the memory 202.

The storage unit 29 stores a cookie information DB 291 and a distribution setting DB 292. The storage unit 29 is implemented by the HDD 209 or the memory 202 illustrated in FIG. 4.

TABLE 1

| DSP cookie | SSP cookie | Visited Domain 1 | Visited Domain 2 |
|---|---|---|---|
| 1234 | ABCD | zzz.com | xxx.com |
| 2345 | BCDE | yyy.com | vvv.com |
| — | — | — | — |

Table 1 schematically indicates data stored in the cookie information DB 291. The cookie information DB 291 associates the DSP cookie and the SSP cookie. Further, a visited domain indicating a domain visited by the viewer is registered in the cookie information DB 291. The DSP cookie and the SSP cookie are associated with each other using a technique called a cookie sync. In addition, the visited domain is acquired when the viewer visits a website to which a tag (action monitoring tag) is attached by the DSP 20. Therefore, the DSP 20 can identify the DSP cookie based on the SSP cookie, and further can determine what type of website the viewer is interested in.

TABLE 2

| Advertiser ID | Image ID | Attribute of Target of Advertisement | Attribute of Non-Target of Advertisement |
|---|---|---|---|
| 001 | G001-1 | Male<br>Age: 30s<br>17:00-24:00 | Minors |
| 002 | G001-2 | Female<br>Age: 30s-60s<br>10:00-17:00 | Male |
| — | — | — | — |

Table 2 schematically indicates data stored in the distribution setting DB 292. In the distribution setting DB 292, an advertiser ID, an image ID, attributes of a target of advertisement (attributes of a preferable target person), and attributes of a non-target of advertisement (attributes of a unpreferable target person) are registered. The advertiser ID is identification information for specifying or identifying an advertiser as a provider of a wide-angle image. The image ID is identification information for specifying or identifying a wide-angle image provided by the advertiser. The DSP 20 refers to the attributes of the preferable target person or the attributes of the unpreferable target person that are set for the provider of a wide-angle image, to determine whether to transmit the wide-angle image.

ID is an abbreviation of identification and means an identifier or identification information. ID is represented by either one or a combination of a name, a code, a character string, and a numeral value, and used for uniquely distinguishing a specific target from a plurality of objects. The same description applies to other IDs described below. The advertisement target attribute is an attribute of a viewer to which the advertiser wishes to deliver advertisements. The non-advertisement target attribute is an attribute of a viewer to which the advertiser does not want to deliver advertisements. The DSP 20 compares attributes of the viewer determined based on the cookie information DB 291 and the like with the information stored in the distribution setting DB 292 to convert the attribute of the viewer into a numerical value. The DSP 20 determines a bid price based on the numerical value. Various information such as a time zone, day of the week, an area of the viewer, etc., may be taken into account in determining the bid price.

(Functions of DSP 20)

The request receiving unit 21 receives an advertisement request from the SSP 50. The request receiving unit 21 acquires basic information such as an advertisement space ID of the terminal apparatus 30 based on request information. The bid determination unit 22 evaluates the advertisement request received by the request receiving unit 21 with reference to the cookie information DB 291 and the distribution setting DB 292, to determine a bid price. In some cases, the bid determination unit 22 determines that no bid is to be made. Specifically, the bid determination unit 22 identifies the DSP cookie based on the SSP cookie, as described above. Further the bid determination unit 22 determines a bid price based on how much the attribute information accumulated in association with the DSP cookie matches a request of the advertiser stored in the distribution setting DB 292.

The bidding unit 23 submits a bid to the SSP 50 with the determined bid price. In a case the bid wins the auction, the bidding unit 23 acquires the successful bid ID. Further, the bidding unit 23 associates the acquired successful bid ID with the advertisement request.

The advertisement request receiving unit 24 acquires an advertisement request including a successful bid ID and a DSP cookie from the terminal apparatus 30, the request being made based on the access information 1. The advertisement request receiving unit 24 identifies a specific advertisement request based on the successful bid ID. The advertisement request from the terminal apparatus does not necessarily include a DSP cookie. The DSP cookie is used when an SSP cookie and an DSP cookie are not associated with each other.

The image requesting unit 25 transmits, to the image distribution apparatus 10, a request for the access information 2, together with a DSP cookie, an advertiser ID, and a request content. The advertiser is identified by the advertiser ID. The advertisement space 7 is identified by an advertisement space ID included in the request content. In one example, the image requesting unit 25 further transmits the attributes of the viewer to the image distribution apparatus 10. As a result, the image distribution apparatus 10 can distribute the spherical image 6 suitable for the viewer.

<<Functions of Terminal Apparatus 30>>

The terminal apparatus 30 includes a web page acquisition unit 31, a web page analysis unit 32, a web page display unit 33, an operation receiving unit 34, and a script execution unit 35. These functions of the terminal apparatus 30 are functions or means implemented by the CPU 301 executing the program 304p loaded from the flash memory 304 onto the RAM 303, illustrated in FIG. 5.

The operation receiving unit 34 receives various operations performed by a viewer using the terminal apparatus 30. Specifically, the operation receiving unit 34 receives operations performed to the browser 8 executed by the terminal apparatus 30. When a web page includes a program described in a script language (the above-described script), the operation receiving unit 34 receives an operation performed to the web page as a trigger to activate the script. In the present embodiment, it is not strictly distinguished whether a target of the operation is the terminal apparatus 30, the browser 8, or the web page. In other words, an operation to the terminal apparatus 30, an operation to the browser 8, and an operation to the web page have equivalent meanings.

The web page acquisition unit 31 communicates with the advertiser web server 70 and the partner site web server 60 in response to an operation by the viewer or in response to an activation of the script, to acquire a web page from the advertiser web server 70 and the partner site web server 60.

The web page analysis unit 32 reads an HTML included in the screen information in order from the top, to analyzes the structures of sentences and image data included in the HTML. Further, the web page analysis unit 32 detects a linkage with the sentences and the image data of the HTML described in CSS, to associate styles with the sentences and the image data included in HTML. In addition, the web page analysis unit 32 detects a script tag from the HTML, to extract a script described in a script language. The web page analysis unit 32 sends the HTML and the CSS to the web page display unit 33, and sends the script to the script execution unit 35.

The web page display unit 33 displays a web page on the display 315, in an order in which analysis is completed from the top of the HTML. Further, the web page display unit 33 updates the web page according to an operation performed to the web page.

The script execution unit 35 executes the script extracted by the web page analysis unit 32. The specific content of the script varies depending on the web page. In the present embodiment, as a script, an advertisement tag associated with the advertisement space 7, the access information 1 acquired from the SSP 50, the access information 2 acquired from the DSP 20, advertisement data distributed from the image distribution apparatus 10 are detected.

The script execution unit 35 includes an advertisement space detector 36. The advertisement space detector 36 is a function implemented by executing, by the terminal apparatus 30, an advertisement tag associated with the advertisement space 7 included in the screen information acquired by the web page acquisition unit 31. The advertisement space detector 36 transmits an advertisement request together with the SSP cookie to the SSP 50 based on an URL associated with the advertisement space 7.

The script execution unit 35 further includes an access information acquisition unit 37, which acquires the access information 1 from the SSP 50. The access information 1 is written in a script language. The script execution unit 35 further includes an advertisement requesting unit 38. The advertisement requesting unit 38 accesses the DSP 20 based on an URL included in the access information 1, to send to the DSP 20 a request for an advertisement together with the successful bid ID and the DSP cookie. As a response to this request, the advertisement requesting unit 38 acquires the access information 2 and an advertisement opportunity ID. The access information 2 is also written in a script language.

The script execution unit 35 further includes an advertisement acquisition unit 39. Based on the URL of the image distribution apparatus 10 included in the access information 2, the advertisement acquisition unit 39 designates the advertisement opportunity ID and requests the image distribution apparatus 10 for advertisement data. The image distribution apparatus 10 generates advertisement data in response to the request from the advertisement acquisition unit 39. The advertisement acquisition unit 39 acquires the generated advertisement data. The advertisement data of the present embodiment includes the spherical image 6, the display pattern, the display program, and the operation history program. The operation history program causes an operation history transmitter 42 (describe below) to transmit an operation history indicating operations performed to the image distribution apparatus 10. The display program causes any one of the attention points defined by the display pattern to be included in a display region when no attention point is included in the display region or in response to an operation by the viewer. If the attention point is included, the display pattern may not be determined. Further, the display program updates a display mode of the spherical image 6 to reflect an operation performed to the spherical image 6. The operation history program and the display program are also described in a script language and are executed by the script execution unit 35.

The script execution unit 35 further includes an advertisement display unit 40. The advertisement display unit 40 displays the advertisement data acquired from the image distribution apparatus 10. The advertisement display unit 40 is mainly implemented by the display program, and displays the spherical image 6 (i.e., advertisement) in the advertisement space 7. Further, the advertisement display unit 40 displays the spherical image 6 in such a manner that an effect of the advertisement increases. The advertisement display unit 40 includes an attention point display unit 43. The attention point display unit 43 displays the attention point included in the spherical image 6.

The terminal apparatus 30 acquires an image cookie of the image distribution apparatus 10 from the advertisement data received from the image distribution apparatus 10. The terminal apparatus 30 stores the image cookie in the storage unit 49. The advertisement acquisition unit 39 transmits the image cookie to the image distribution apparatus 10. The image distribution apparatus 10 associates the image cookie transmitted from the advertisement acquisition unit 39 with a DSP cookie.

The script execution unit 35 further includes an operation history recording unit 41. The operation history recording unit 41 is mainly implemented by the operation history program, and records operation information to the spherical image 6 as an operation history. A detailed description of the operation history is provided below in a description of the image distribution apparatus 10. The operation history transmitter 42 is mainly implemented by the operation history program. The operation history transmitter 42 transmits, to the image distribution apparatus 10, the operation history to the spherical image 6 displayed in the advertisement space 7 together with the image cookie and an image ID (identifying the spherical image 6). When the spherical image 6 is clicked, the operation history transmitter 42 further transmits, to the image distribution apparatus 10, information indicating that the spherical image 6 is clicked, together with the display pattern and an angle of view when the clicking operation is performed.

<<Functions of Image Distribution Apparatus 10>>

The image distribution apparatus 10 includes an image information response unit 11, an advertisement distribution unit 12, an attention point determination unit 13, and an operation history acquisition unit 14. These functions of the image distribution apparatus 10 are functions or means implemented by the CPU 201 executing the program 209p loaded from the HDD 209 onto the memory 202.

Further, the image distribution apparatus 10 has a storage unit 19, which is implemented by the HDD 209 or the memory 202 illustrated in FIG. 4. The storage unit 19 stores a distribution history DB 191, an operation history DB 192, a cookie correspondence DB 193, an advertisement image DB 194, and a pattern DB 195.

TABLE 3

| Image ID | Browsing Time | Image Cookie | Viewing Angle of View 1 | Viewing Angle of View 2 | Viewing Angle of View 3 | Click-time Angle of View |
|---|---|---|---|---|---|---|
| G001-1 | 2017/10/10 12:20 | cookie name; cookie value; effective period; domain | (Xs1, Ys1) (Xe1, Ye1) enlargement: yes; reduction of viewing angle after enlargement: no; still time: 10 secs | (Xs2, Ys2) (Xe2, Ye2) enlargement: no; reduction: yes, still time: 5 secs | (Xs3, Ys3) (Xe3, Ye3) enlargement: yes; reduction of viewing angle after enlargement: no; still time: 3 secs | (Xc1, Yc1) (Xc2, Yc2) |
| — | — | — | — | — | — | — |

Table 3 schematically indicates data stored in the operation history DB 192. The operation history DB 192 stores a history of what kind of operation each viewer performed on the spherical image 6. More specifically, in the operation history DB 192, items of an image ID, a browsing time, a cookie, viewing angles of view 1 to 3, and an angle of view when a clicking operation is performed are recorded. The angle of view when a clicking operation is performed can be referred to as a "click-time angle of view" hereinafter. The image ID is information for identifying the specific spherical image 6. The image cookie is information based on which a viewer operating the terminal apparatus 30 or the terminal apparatus 30 is identified. The image cookie is an example of apparatus identification information. Each of the viewing angles of view 1 to 3 is an angle of view when a viewer views the spherical image 6. Each of the viewing angles of view 1 to 3 stores a viewing time, information indicating whether the image has been enlarged, an angle of view after enlargement in a case where the image has been enlarged, and information indicating whether the image has been reduced. Thus, for each image, the angle of view that is considered to attract an interest of the viewer is recorded. Each of the viewing angles of view 1 to 3 is an angle at which the viewer keeps viewing the spherical image 6 without rotating the spherical image 6 for equal to or more than a predetermined time period (e.g., one second). The operation history recording unit 41 of the terminal apparatus 30 records three angles of view corresponding to the three longest time periods during which the viewer keeps viewing the spherical image 6. In another example, the operation history recording unit 41 records one angle of view. In still another example, the operation history recording unit 41 records four or more angles of view. Further, the operation history recording unit 41 records, for each of the viewing angles of view 1 to 3, information indicating whether a viewer has enlarged or reduced the spherical image 6. The image distribution apparatus 10 can determine the attention point based on the operation history as described. Since the image cookie is associated with the image ID, retargeting advertisement is implemented.

TABLE 4

| Advertiser ID | Image ID | Priority | Target Attribute |
|---|---|---|---|
| 001 | G001-1 | A | Male/Married/30s |
|  | G001-2 | C | Female/Single/40s |
|  | G001-3 | B | Male/Single/20s |
|  | — | — | — |
| 002 | G002-1 | A | Female/Single/30s |
|  | — | — | — |

Table 4 schematically indicates data stored in the advertisement image DB 194. The advertisement image DB 194 stores information relating to the spherical image 6 to advertised. In the advertisement image DB 194, an advertiser ID, an image ID, a priority, and a target attribute are registered in association with each other. Since an advertiser is determined by the DSP 20, an image to be distributed is identified, from among images that the determined advertiser wants to deliver, based on at least one of the priority in Table 4 and a degree of matching between the attribute of the viewer and the target attribute in Table 4. In a case of retargeting advertisement, an image associated with the image cookie in the operation history DB 192 is distributed.

TABLE 5

| DSP Cookie | Image Cookie |
|---|---|
| 1234 | 12AB |
| 2345 | 34CD |
| — | — |

Table 5 schematically indicates data stored in the cookie correspondence DB 193. The cookie correspondence DB 193 associates a DSP cookie with an image cookie. The DSP cookie is notified from the DSP 20. The image cookie is notified from the terminal apparatus 30. Since the DSP cookie and the image cookie are associated with each other, the image distribution apparatus 10 can identify a viewer using the DSP cookie alone.

TABLE 6

| Image ID | Pattern ID | Pattern | Combination of Each of Coordinates 1 to 4 and Angles of View Changeable in Three Steps | Number of Clicks (Total: 81) | | |
|---|---|---|---|---|---|---|
| G001-1 | P001 | coordinates 1→2→3→4 | Coordinates: 1 (large, middle, small); 2 (large, middle, small); | 5 9 2 | 8 3 6 | 19 11 — |

TABLE 6-continued

| Image ID | Pattern ID | Pattern | Combination of Each of Coordinates 1 to 4 and Angles of View Changeable in Three Steps | Number of Clicks (Total: 81) | | |
|---|---|---|---|---|---|---|
| | | | 3 (large, middle, small); 4 (large, middle, small). Total: 81 combinations | 6 1 | 5 4 | — 3 |
| | P002 | coordinates 1→2→4→3 | same as above | — | | |
| | P003 | coordinates 1→3→2→4 | same as above | — | | |
| | P004 | coordinates 1→3→4→2 | same as above | — | | |
| — | — | — | — | — | | |

Table 6 schematically indicates data stored in the pattern DB 195. The pattern DB 195 stores one or more combinations of an order in which the attention points P of the spherical image 6 are to be displayed and an angle of view. The combination of the order and the angles of view is referred to as a "display pattern". In Table 6, four coordinates 1 to 4 are the attention points P. One spherical image 6 can include any suitable number of attention points P other than four, such as equal to or less than three and equal to or more than five. Also, a plurality of different spherical images 6 can different numbers of the attention points P. The display pattern has a display order of the four coordinates 1 to 4. When the number of attention points is four, the number of the display orders is factorial of 4, i.e., 24. In addition, when the angle of view of each attention point P is changed in three steps, for example, the number of combinations of angles of view is 3 to the fourth power. Therefore, for each of the display orders, there are 81 combinations with respect to the angles of view. This means that there are 24×81 display patterns for one spherical image 6. The pattern DB also stores the number of clicks. The number of clicks indicates the number of clicks performed by the viewer for each of the display patterns. The click is an example of an "predetermined operation". In other words, the image distribution apparatus 10 causes a plurality of terminal apparatuses 30 to display the same spherical image 6 in the same display pattern, and each of the terminal apparatuses 30 records information indicating that a clicking operation is performed. This can gradually reduce the distribution of the spherical image 6 in the display pattern having a lower click-through rate. It is preferable that the number of clicks is recorded for each attribute of a viewer, such as gender, age, and family structure. This enables to display the spherical image 6 in a display pattern having a greater number of clicks for the attribute of a viewer.

TABLE 7

| Image Cookie | Image ID | Display Pattern used for Distribution | Clicking (yes/no) |
|---|---|---|---|
| 12AB | G001-1 | P001 | NO |
| 34CD | G001-1 | P002 | NO |
| — | — | — | — |

Table 7 schematically indicates data stored in the distribution history DB 191. The distribution history DB 191 stores, in association with an image cookie, an image ID of the spherical image 6 that has been distributed and the display pattern used for the distribution. In a case where an image cookie is registered in the terminal apparatus 30 when the image distribution apparatus 10 transmits advertisement data, the image distribution apparatus 10 can acquire the registered image cookie from the terminal apparatus 30. Using the information stored in the distribution history DB 191, the image distribution apparatus 10 can avoid distributing the same spherical image 6 to the same viewer or avoid distributing the same spherical image 6 with the same display pattern. Alternatively, the image distribution apparatus can perform retargeting advertising.

<Functions of Image Distribution Apparatus 10>

The image information response unit 11 assigns an advertisement opportunity ID to the DSP cookie, the advertiser LD, the request content (including the advertisement space ID) acquired from the DSP 20, and transmits the advertisement opportunity ID to the DSP 20, together with the access information 2. Based on the advertisement opportunity ID, an advertisement distribution opportunity can be identified for each advertisement space 7 of the terminal apparatus 30.

In response to receiving the request for the advertisement data and the advertisement opportunity ID from the terminal apparatus 30, the advertisement distribution unit 12 determines the spherical image 6 and the display pattern to be distributed. First, the advertisement distribution unit 12 refers to the advertisement image DB 194 to identify the spherical image 6 associated with the advertiser ID acquired from the DSP 20. It is preferable that the advertisement distribution unit 12 takes the attribute of the viewer into consideration. In one example, the advertisement distribution unit is notified of the attribute of the viewer from the DSP 20. In another example, the image distribution apparatus 10 stores the attribute of the viewer in association with the image cookie. Next, the advertisement distribution unit 12 refers to the pattern DB 195 to determine the display pattern of the spherical image 6. For example, the advertisement distribution unit 12 identifies a display pattern corresponding to the largest number of clicks. In another example, the advertisement distribution unit 12 identifies one or more display patterns corresponding to the number of clicks that is equal to or larger than a threshold value and selects an arbitrary display pattern from among the identified one or more display patterns. It is preferable that the advertisement distribution unit 12 also takes the attribute of the viewer into consideration when determining the display pattern.

The operation history acquisition unit 14 acquires, from the terminal apparatus 30, the operation history together with the image cookie and the image ID. The operation history acquisition unit 14 stores the acquired operation history and image ID in the operation history DB 192. The operation history includes two types of operation history. One is an operation history for determining the attention point P, and the other is an operation history (clicking) for updating the number of clicks.

The image distribution apparatus 10 can include the operation history recording unit 41 of the terminal apparatus 30. Since the operation history recording unit 41 requires time-series operation contents, in some cases, the image distribution apparatus 10 has difficulty in acquiring the time-series operation contents depending on the communication band or the like. By contrast, since the operation history recording unit 41 of the terminal apparatus 30 has only to transmit the latest operation history to the image distribution apparatus 10, the communication load can be reduced.

The attention point determination unit 13 determines the attention point P of the spherical image 6. The attention point P are determined in various ways. A detailed description is given later of how the attention point is determined. The attention point determination unit 13 registers the display pattern using the determined attention point P in the pattern DB 195.

<Determination of Attention Point P>

<<Determining Attention Point P Based on Feature Value>>

Figure 11:
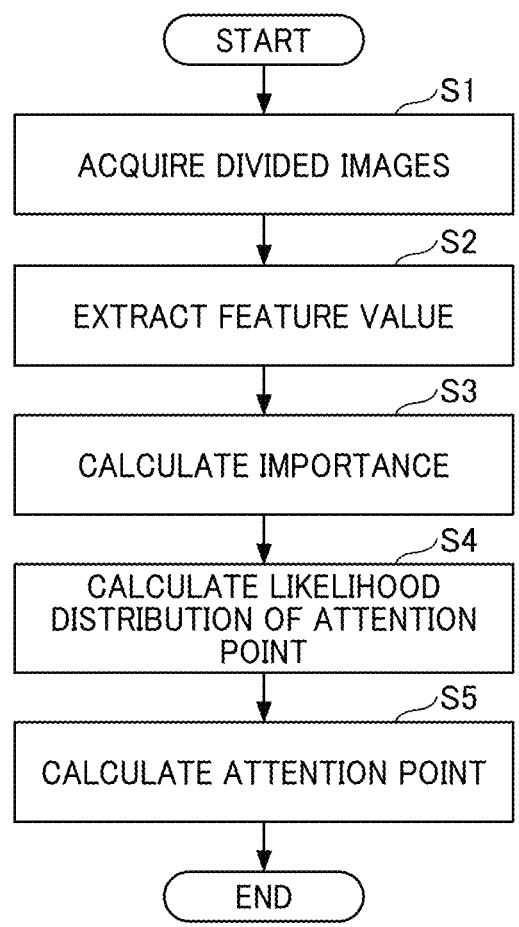
FIG. 11 is a flowchart illustrating an example of an operation of determining an attention point P, performed by an attention point determination unit, according to an embodiment of the present disclosure.
Figure 12A:
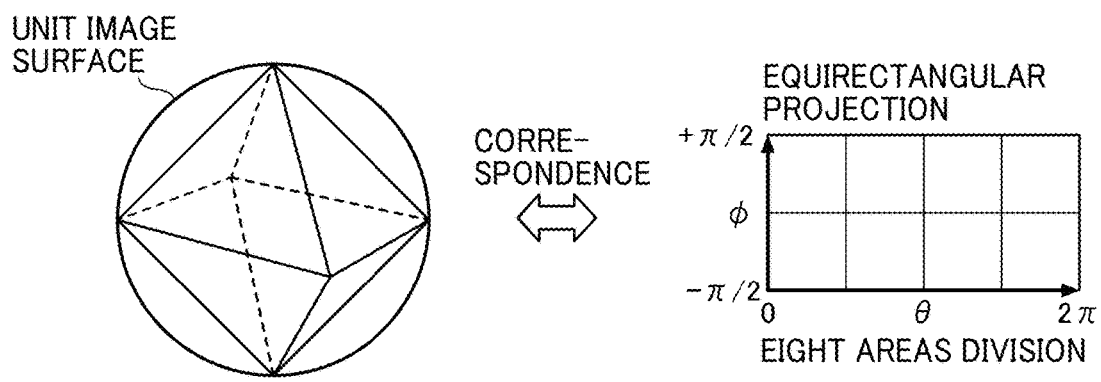
FIGS. 12A and 12B are illustrations for explaining an example of divided images of an omnidirectional image, according to an embodiment of the present disclosure.
Figure 12B:
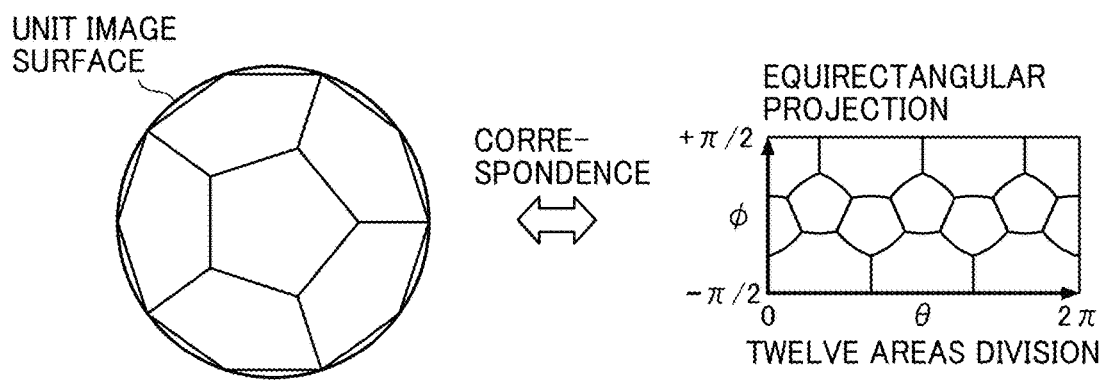

FIG. 11 is a flowchart illustrating an example of an operation of determining the attention point P, performed by the attention point determination unit 13. In step S1, the attention point determination unit 13 defines a regular polyhedron having a center common to a unit sphere, and performs perspective projection transformation using a normal direction of each face as a direction of line of sight, to obtain divided images. FIG. 12A illustrates an example in which a regular octahedron is defined as a projection plane of the spherical image 6. FIG. 12B illustrates an example in which a regular dodecahedron is defined as a projection plane of the spherical image 6.

In step S2, the attention point determination unit 13 extracts a predetermined feature value from each of the divided images obtained in step S1. Since an input image is divided as described above, the divided images have lesser distortion. The feature values are calculated based on the divided images having lesser distortion, thereby implementing a robust processing of a wide-angle image exceeding 180 degrees. Examples of the feature value include color, edge, saliency, an object position, and an object label.

In step S3, the attention point determination unit 13 calculates, for each position (for each pixel) of the input image, importance based on the feature amount extracted from each of the divided images, using a predetermined regression model. Although a detail description of the regression model is omitted, the importance of each position and the feature amount is expressed by a regression function. Further, importance g, which is an output (teaching data) is deter mined in advance by using training data, and the relation between the feature value and the importance g is obtained in advance.

In step S4, under a design concept that the attention point P of a user exists in a direction corresponding to the importance of high value, the attention point determination unit 13 calculates a likelihood distribution of the attention point P based on the distribution of importance calculated in step S3. For example, a region R passing through a viewpoint is defined on the unit image face, and a value obtained by adding the importance of each position in the region R is calculated as an attention point likelihood of the viewpoint.

In step S5, the attention point determination unit 13 calculates the attention point P based on the likelihood distribution of the attention point. In the present embodiment, for example, the attention point determination unit 13 calculates a position corresponding to an image capturing direction corresponding to the maximum likelihood value of the likelihood distribution of the attention point, and determines the calculated position as the attention point P.

By performing the above described processes, several numbers of attention points P are calculated. The attention point determination unit 13 specifies a predetermined number of attention points P from among the first to n-th attention points P. In another example, the attention point determination unit 13 specifies one or more attention points P having a value equal to or more than a threshold value from among the first to n-th attention points P. Further, the attention point determination unit 13 stores, in the pattern DB 195, a display pattern, which is a combination of the display order of the attention points P and the angle of view.

<Determining Person as Attention Point P>

A person is considered as a subject to which a viewer pays attention. Face recognition is known as a method of detecting a person. Face recognition is implemented using a known technique of performing pattern matching by detecting a histogram of oriented gradients (HOG) feature or Haar-like feature. The attention point determination unit 13 detects the center of the face as the attention point P. When the large number of faces are detected, the number of faces can be reduced to a preset number by recognizing two or more faces within a short distance as one face.

<<Determining Character as Attention Point P>>

There is a possibility that characters contain important information. Characters can be detected using a learning model obtained by machine learning. In another example, characters can be detected using Optical Character Reader (OCR).

<<Determining Smiling Face as Attention Point P>>

A person's smiling face is considered as a subject to which a viewer pays attention. A smiling face can be detected using the above-described face recognition, or using a known technique of performing a pattern matching based on patterns of smiling face stored in advance. When the large number of faces are detected, only a smiling face can be determined as the attention point P. In addition to a smiling face, a face expressing sadness, anger, embarrassment, etc. can be determined as the attention point P.

<<Determining Child as Attention Point P>>

In a case where there is a child among adults, a viewer may pay attention to the child. By contrast, in a case where there is an adult among many children, a viewer may pay attention to the adult. A child or an adult can be detected using a position of face. When a position of one face among faces identified by the above-described face recognition technique is lower than the positions of the other faces, the face that is present at the lower position is predicted as a face of a child. When a position of one face among faces identified by the above-described face recognition technique is higher than the positions of the other faces, the face that is present at the higher position is predicted as a face of an adult.

<<Determining Attention Point P Using Operation History>>

In the operation history DB 192, the viewing angles of view are stored for each spherical image 6. The attention point determination unit 13 edits the viewing angles of view stored in the operation history DB 192 to determine the attention point P. Specifically, the attention point determination unit 13 extracts the spherical images identified by the same image ID. When one click-time angle of view overlaps with another click-time angle of view by equal to larger than a threshold value, the two angles of view are regarded as the same viewing angle of view, and a centroid between the two angles of view is calculated. Then, the attention point determination unit 13 determines the first to fourth largest number of angles of view as the attention points P. The number of attention points P determined by the attention point determination unit 13 can be any suitable number other than four.

<<Determining Arbitrary Object as Attention Point P>>

It is considered that an advertiser knows the attention point P that the advertiser wants a viewer to view. Therefore, the attention point determination unit 13 detects an object designated by the advertiser and determines the detected object as the attention point P. In another example, the attention point determination unit 13 detects the advertiser's product or service, such as an automobile, a furniture, and foods by pattern recognition and determines the detected product or service as the attention point P.

For each of the attention points P determined as described above, any one of the large, medium, and small angles of view is automatically determined. Alternatively, the angle of view can be determined together with the determination of the attention point P.

<Operations>

Figure 13B:
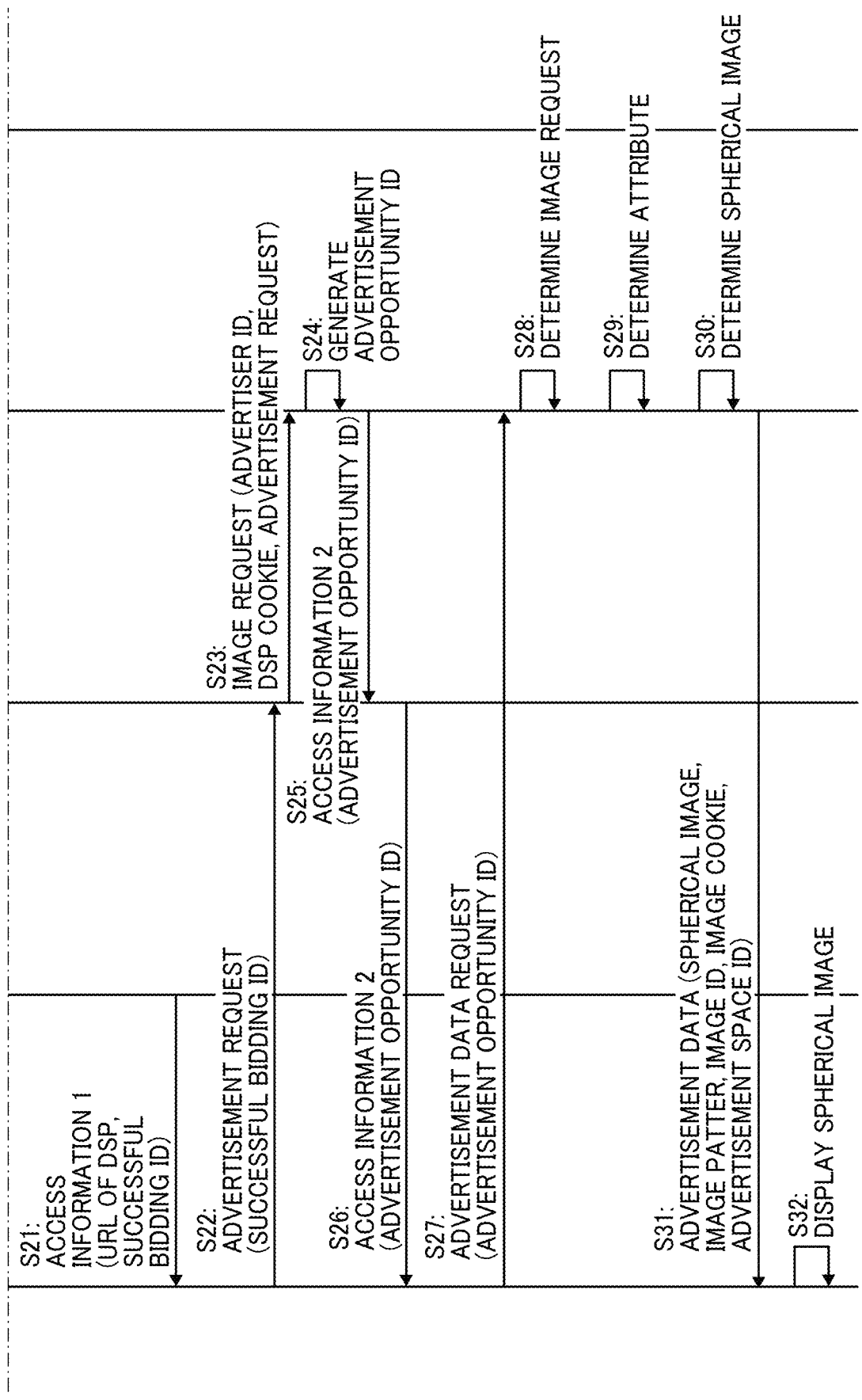

FIGS. 13A and 13B are a sequence diagram illustrating an example of an operation of distributing the spherical image 6 to be displayed as an advertisement, performed by the image display system 100.

S11: First, a viewer operates the terminal apparatus 30 to cause the terminal apparatus 30 to communicate with the partner site web server 60. In response to receiving the operation at the operation receiving unit 34 of the terminal apparatus 30, the web page acquisition unit 31 acquires a web page.

S12: The web page analysis unit 32 of the terminal apparatus 30 analyzes the web page to extracts an HTML, CSS and script. The web page display unit 33 displays the web page based on the HTML and the CSS.

S13: The advertisement space detector 36 of the terminal apparatus 30 executes an advertisement tag (script) associated with the advertisement space 7, thereby transmitting an advertisement request to the SSP 50. The advertisement request includes an SSP cookie, a domain of the partner site web server 60, an advertisement space ID, an advertisement space size, an advertisement format, a browser type, and an OS type.

S14: The advertisement request acquisition unit 52 of the SSP 50 receives the advertisement request. The advertisement requesting unit 51 accepts the advertisement request. The advertisement requesting unit 51 detects the SSP cookie and notifies the DSP 20 of the advertisement request, to sell the advertisement space 7.

S15: The request receiving unit 21 of the DSP 20 sends the advertisement request to the bid determination unit 22. The bid determination unit 22 of the DSP 20 refers to the cookie information DB 291 to identify a DSP cookie associated with the SSP cookie.

S16: The bid determination unit 22 determines an attribute based on the DSP cookie. In one example, the bid determination unit 22 refers to the visited domain stored in the cookie information DB 291. In another example, the bid determination unit 22 refers to attribute information of the viewer specified by the DSP cookie as appropriate.

S17: The bid determination unit 22 refers to the distribution setting DB 292 to determine whether to transmit a wide-angle image to the viewer based on the attributes of a preferable target person or the attributes of an unpreferable target person, each of which attributes is set for a provider of the wide-angle image. In the present embodiment, it is assumed that the bid determination unit 22 determines that a wide-angle image provided by at least one advertiser is to be transmitted.

S18: The bid determination unit 22 determines a bid price based on a budget of the advertiser, a degree of matching of attributes, etc.

S19: The bidding unit 23 of the DSP 20 submits a bid to the SSP 50 with the determined bid price. The successful bid determination unit 54 of the SSP 50 identifies the DSP 20 which offers the highest bid price as a winning bidder from among a plurality of DSPs 20, each of which submits a bid.

S20: In the present embodiment, it is assumed that the illustrated DSP 20 wins a bid. The SSP 50 notifies the DSP 20 of a successful bid ID.

S21: The access information transmitter 53 of the SSP 50 transmits the access information 1 together with the successful bid ID to the terminal apparatus 30.

S22: The advertisement requesting unit 38 of the terminal apparatus 30 executes the access information 1, to transmit an advertisement request together with the successful bid ID to the DSP 20.

S23: The advertisement request receiving unit 24 of the DSP 20 identifies a specific advertisement request based on the successful bid ID. The image requesting unit 25 transmits a request for an image to the image distribution apparatus 10 together with an advertiser ID, the DSP cookie, and the advertisement request.

S24: In response to receiving the request for an image, the image information response unit 11 of the image distribution apparatus 10 generates an advertisement opportunity ID for identifying the advertisement request.

S25: The image information response unit 11 transmits to the DSP 20 the access information 2 associated with the advertisement opportunity ID.

S26: The image requesting unit 25 of the DSP 20 receives the access information 2. The advertisement request receiving unit 24 transmits the access information 2 to the terminal apparatus 30.

S27: The advertisement acquisition unit 39 of the terminal apparatus 30 transmits an advertisement request (advertisement opportunity ID) based on the URL of the image distribution apparatus 10 included in the access information 2. In a case where the terminal apparatus 30 stores an image cookie, the terminal apparatus 30 can transmit the image cookie to the image distribution apparatus 10.

S28: The advertisement distribution unit 12 of the image distribution apparatus 10 identifies the image request based on the advertisement opportunity ID.

S29: The advertisement distribution unit 12 determines the attribute based on the DSP cookie and/or the image cookie.

S30: The advertisement distribution unit 12 identifies the spherical image 6 based on the advertiser ID and the attribute. Specifically, the advertisement distribution unit 12 refers to the advertisement image DB 194, to determine the spherical image 6 to be transmitted based on the attribute of an advertisement distribution target and/or the priority set for the spherical image 6. Further, the advertisement distribution unit 12 identifies a display pattern corresponding to the number of clicks that is equal to or greater than a threshold value as a display pattern to be transmitted. Alternatively, the advertisement distribution unit 12 can select the display pattern to be transmitted randomly while the number of times of distribution of the spherical image 6 is still small.

S31: The advertisement distribution unit 12 transmits, to the terminal apparatus 30, advertisement data including the spherical image 6, the display pattern, the image ID, the image cookie, and the advertisement space ID. An URL of the advertiser web server 70 is associated with the spherical image 6.

S32: The advertisement acquisition unit 39 of the terminal apparatus 30 receives the advertisement data. The advertisement display unit 40 displays the spherical image 6 in the advertisement space 7. When the viewer clicks the advertisement space 7, the operation receiving unit 34 receives this operation. In response to receiving the operation at the operation receiving unit 34, the web page acquisition unit 31 starts communication with the advertiser web server 70.

<Display of Attention Point P>

Hereinafter, a description is given of several examples of how the attention point P is displayed. One or more of the examples described below can be combined as long as there is no contradiction.

<<Displaying Attention Point Even without Viewer's Operation>>

Figure 14:
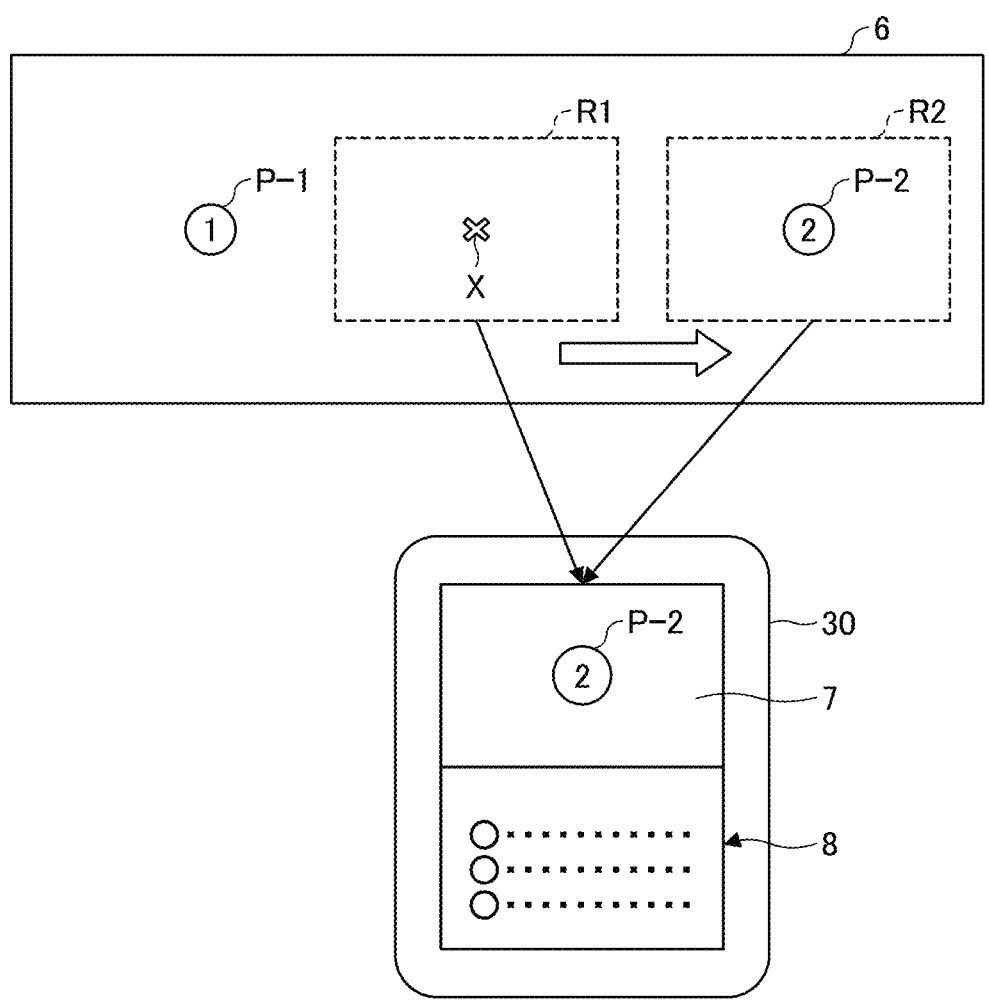
FIG. 14 is an illustration of one example of how the attention point P is displayed, according to an embodiment of the present disclosure.

FIG. 14 is an illustration of one example of how the attention point P is displayed. In FIG. 14, the spherical image 6 in equirectangular projection and the terminal apparatus 30 are illustrated, for the sake of explanatory convenience. The spherical image 6 has two attention points P-1 and P-2. The browser 8 or an application equivalent to the browser 8 is operating on the terminal apparatus 30. The terminal apparatus 30 displays the spherical image 6 in the advertisement space 7 in a web page displayed by the browser 8. The terminal apparatus 30 displays the attention point P-1 in an initial state. In response to a viewer's operation of rotating the spherical image 6, the terminal apparatus 30 displays a display region R1. Thereafter, in a case where no operation is made by the viewer to the spherical image 6, the attention point display unit 43 rotates the spherical image 6 so that the spherical image 6 of an angle of view determined in advance (indicated as a display pattern) is displayed with the attention point P-2 being at the center of the advertisement space 7.

Such control is implemented by determining the attention point P to be displayed next according to the following rules: (i) Attention point P that is closest in distance; (ii) Attention point P viewed most recently; (iii) Attention point P determined randomly; (iv) Attention point P that is to be displayed subsequently to another attention point P that was most recently displayed, according the display pattern; (v) Attention point P that has not been displayed (in a case where there are a plurality of attention points P that are not being displayed, an attention point P that is closest in distance, an attention point P whose display order is earliest from among attention points P included in the display pattern and have not been displayed, an attention point P randomly determined); and (vi) Attention point P having the largest number of times of viewing in the operation history. It is assumed that any one of (i) to (vi) is set in the advertisement data in advance. Alternatively, the viewer may select any one of (i) to (vi).

Figure 15A:
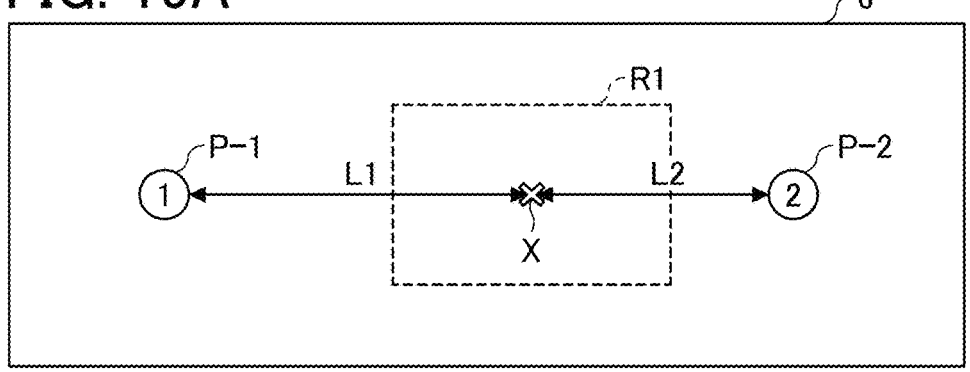
FIGS. 15A to 15D are illustrations for explaining a process of determining the attention point P based on rules (i) to (iv), according to an embodiment of the present disclosure.

FIGS. 15A to 15D are illustrations for explaining a process of determining the attention point P based on the rules (i) to (iv). Each of FIGS. 15A to 15D illustrates an example in which a display region R1 including no attention point P is displayed according to the viewer's operation. In a case where the rule (i) is applied, as illustrated in FIG. 15A, the attention point display unit 43 calculates a distance L1 between a center X of the display region R1 and the attention point P-1 and a distance L2 between the center X and the attention point P-2. Since the spherical image 6 is a sphere, a curve (arc) on a sphere is the shortest distance. However, since an angle of view defined by a straight line connecting a center of the sphere and the center X of the display region R1 and a straight line connecting the center of the sphere and the attention point P-1 (or P-2) correlates with the distance, the attention point display unit 43 can calculate the angle of view instead of the distances L1 and L2. Then, the attention point display unit 43 displays the attention point P-2 corresponding to the distance L2 shorter than the distance 1, with the angle of view determined for each attention point P included in the advertisement data. The viewer can see the attention point P with the smallest rotation amount of the spherical image 6.

Figure 15B:
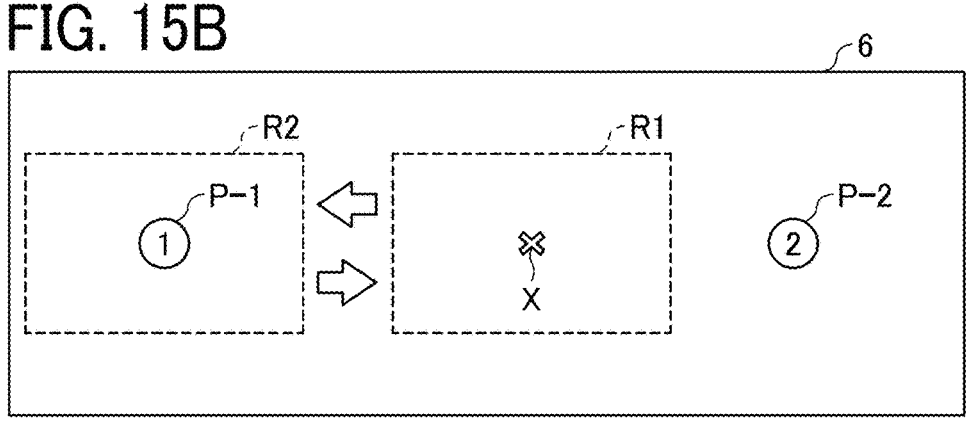

In a case where the rule (ii) is applied, as illustrated in FIG. 15B, the attention point display unit 43 records an attention point P that enters the display region and the order, from among the attention points P included in the display pattern. For example, in a case where the attention point P-1 is an attention point P that is already displayed and displayed most recently, the attention point display unit 43 displays the attention point P-1 with the angle of view determined for each of the attention points P. In this case, the viewer has a feeling that the display region returns to the attention point P-1 that was displayed most recently. Accordingly, the viewer feels reassured.

Figure 15C:
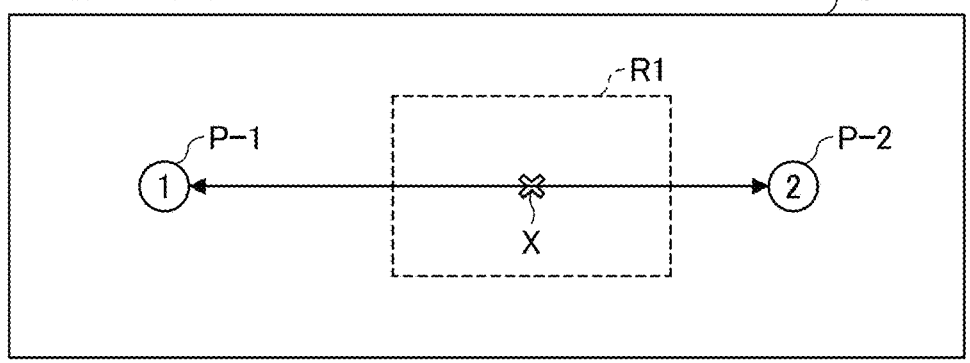

In a case where the rule (iii) is applied, as illustrated in FIG. 15C, the attention point display unit 43 randomly determines an attention point P to be displayed next, from among the attention points P included in the display pattern. In this case, since the attention point P to be displayed next varies, the viewer can view and enjoy various attention points P.

Figure 15D:
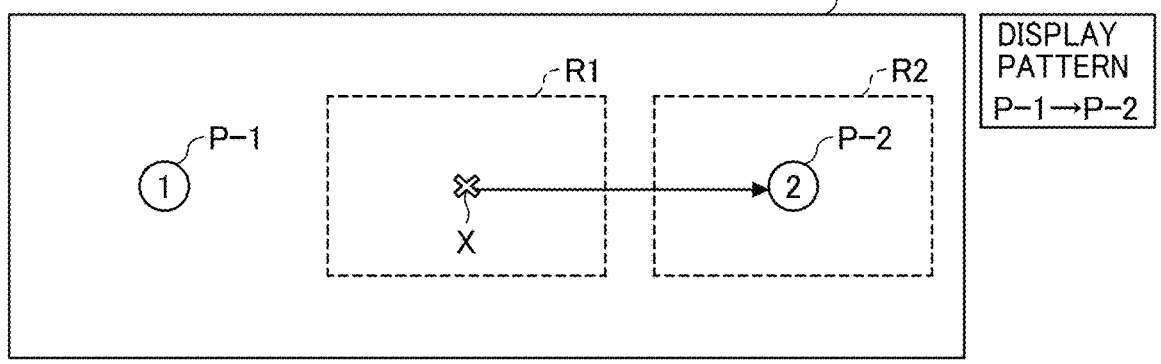

In a case where the rule (iv) is applied, as illustrated in FIG. 15D, the attention point display unit 43 records at least an attention point P that entered the display region most recently from among the attention points P included in the display pattern. For example, in a case where the attention point P-1 is an attention point that entered the display region most recently, the attention point display unit 43 refers to the display pattern, to display the attention point P-2, which is defined as an attention point to be displayed subsequently to the attention point P-1, with the angle of view determined for each of the attention points P. The viewer can view the attention points P in an order defined by the display pattern.

Figure 16A:
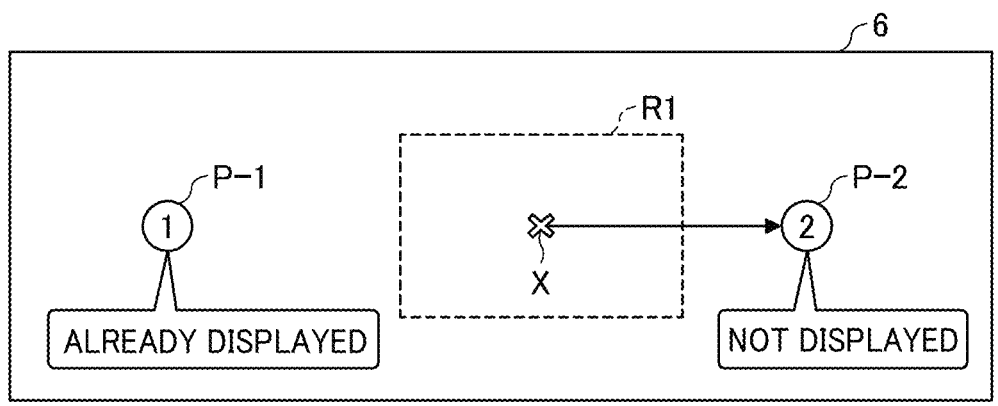
FIGS. 16A and 16B are illustrations for explaining a process of determining the attention point P based on rules (i) to (iv), according to an embodiment of the present disclosure.

In a case where the rule (v) is applied, the attention point display unit 43 records one or more attention points P that have entered the display region, from among all the attention points P. For example, as illustrated in FIG. 16A, in a case where the attention point P-1 has already been displayed and the attention point P-2 has not been displayed, the attention point display unit 43 displays the attention point P-2 with the angle of view determined for each of the attention points P. The viewer can view an attention point P that the viewer has not viewed yet, without manual operation. In other words, the advertiser can have the viewer view the attention points P positively.

Figure 16B:
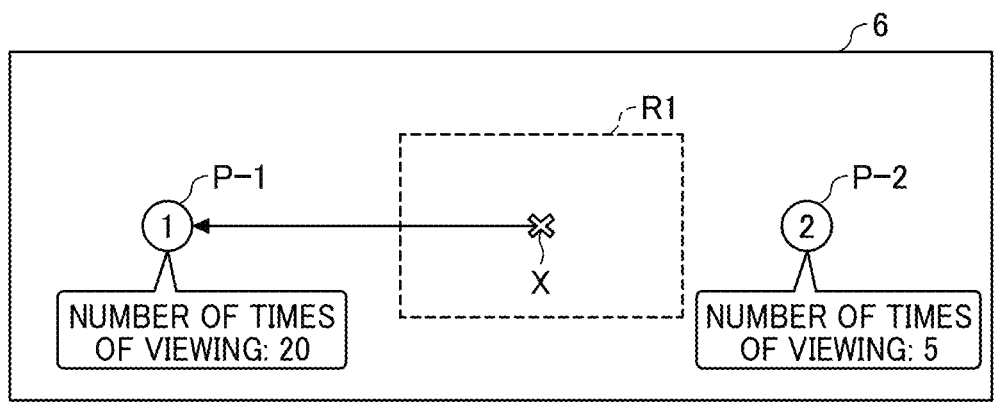

In a case where the rule (vi) is applied, information indicating the number of times of viewing is attached to the advertisement data, for each of the attention points P. As illustrated in FIG. 16B, the attention point display unit 43 determines that an attention point P having the largest number of times of viewing times is to be displayed, from among all the attention points P. The viewer can view the attention point P frequently viewed by other viewers without manual operation. The number of times of viewing is the sum of the viewing angles of view or the click-time angles of view in operation histories transmitted from a plurality of terminal apparatuses 30 operated by a plurality of viewers.

In another example, the attention point display unit 43 assigns weights to the rules (i), (v) and (vi) and gives a score to each of the attention points P. In this case, the attention point display unit 43 displays the attention point P having the highest score. For example, the shorter the distance from the center X of the display region R1 currently being displayed is, the higher score is given. Further, for example, a fixed score is given to the attention point P that is not displayed. The larger the number of times of viewing is, the higher score is given. Then, the sum of the scores are calculated for each of the attention points P. The attention point display unit 43 displays an attention point P having the highest score. As a result, the attention point display unit 43 can determine an attention point P to be displayed considering several factors involved. In another example, the longer the distance from the center X of the display region R1 currently being displayed is, the higher score is given. As a result, many attention points P can be displayed during the rotation of the spherical image 6.

In the description of the rules with reference to FIGS. 15A to 15D and FIGS. 16A to 16B, the angle of view is determined for each of the attention points P. In another example, the terminal apparatus 30 can determine the angle of view. In still another example, the angle of view can be continuously changed from the minimum angle of view to the maximum angle of view (or vice versa) instead of determining one angle of view.

Figure 17:
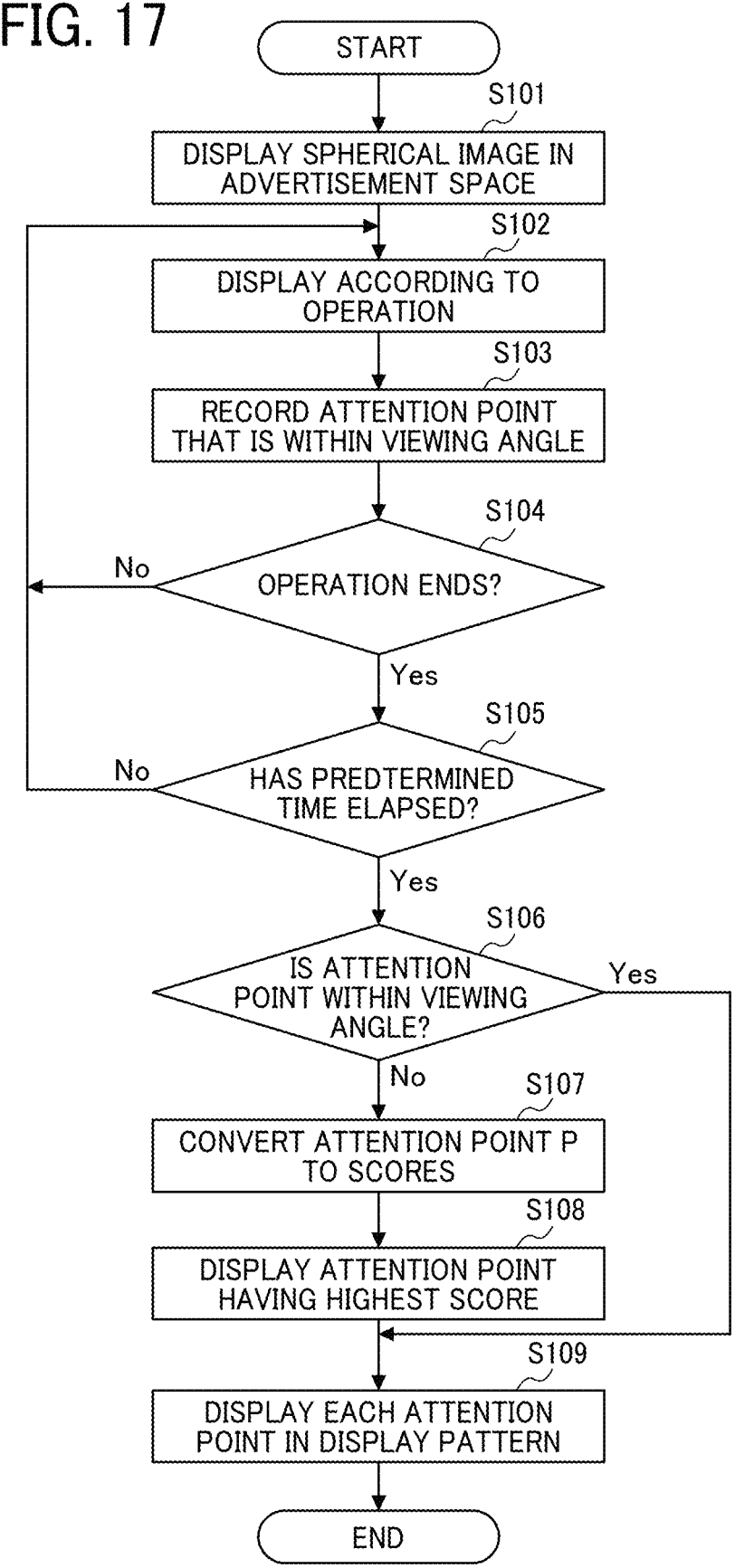
FIG. 17 is a flowchart illustrating an example of an operation of displaying the attention point by an attention point display unit, according to an embodiment of the present disclosure.

FIG. 17 is a flowchart illustrating an example of an operation of displaying the attention point P by the attention point display unit 43. With reference to FIG. 17, an example is described in which the attention point P to be displayed is determined based on the score given to each of the attention points P. The advertisement display unit 40 displays the spherical image 6 included in the advertisement data transmitted from the image distribution apparatus 10 in the advertisement space 7 (S101). In a case where a viewer performs no operation on the spherical image 6, the attention points P in the spherical image 6 are automatically displayed one after another based on the display pattern. In a case where the viewer operates the spherical image 6, the operation is preferentially used to update the display of the spherical image 6.

The operation receiving unit 34 receives the operation on the spherical image 6 performed by the viewer. The advertisement display unit 40 rotates or enlarges/reduces the spherical image 6 according to the operation received by the operation receiving unit 34 (S102).

The attention point display unit 43 records one or more attention points that have entered the display region (S103). In a case where the display region is large enough such that the entire spherical image 6 fits in the display region, all the attention points P are displayed in the display region. However, this does not mean that the viewer views all the attention points P. Therefore, in a case where the size of the display region is equal to or larger than a threshold value, the attention point display unit 43 preferably does not record the attention point P that has entered the display region.

The advertisement display unit 40 determines whether the operation performed by the viewer on the spherical image 6 ends (S104). Specifically, the advertisement display unit 40 determines whether an instruction for displaying an image is input. More specifically, the advertisement display unit determines whether the viewer is touching the touch panel 316 and whether angular velocity or acceleration exceeding a threshold value is occurring. For example, in a case where the viewer operates an image by operating the touch panel 316 with his or her finger or the like, the advertisement display unit 40 determines that the operation on the spherical image 6 is currently being performed as long as the viewer's finger or the like is touching the touch panel 316. By contrast, the advertisement display unit 40 determines that the operation performed by the viewer on the spherical image 6 ends, when the viewer's finger or the like moves away from the touch panel 316. Further, for example, in a case where an image display is changed according to the angular velocity or acceleration of a terminal, the advertisement display unit 40 determines that the operation on the spherical image 6 is currently being performed, as long as the angular velocity or acceleration exceeding a threshold value is being detected (e.g., as long as a rotation or movement of the terminal apparatus 30 by a certain amount or more is being detected). By contrast, the advertisement display unit 40 determines that the operation performed by the viewer on the spherical image 6 ends, when the angular velocity or acceleration exceeding a threshold value is no longer detected (e.g., when a rotation or movement of the terminal apparatus 30 by a certain amount or more is no longer detected). When the advertisement display unit 40 determines that the operation performed by the viewer on the spherical image 6 does not end (S104: NO), the operation returns to S102.

By contrast, when the advertisement display unit 40 determines that the operation performed by the viewer on the spherical image 6 ends (S104: YES), the attention point display unit 43 determines whether a predetermined time period has elapsed since the end of the operation (S105). The process of step S105 is performed, because if the spherical image 6 is rotated immediately after the viewer finishes the operation on the spherical image 6, a next operation by the viewer can be obstructed. For example, when a user wants to rotate an image by a large amount using his or her finger or the like, the user first rotates the image by moving his or her finger from one end of a screen to the other end of the screen. Then, if the user wants to rotate the image more, the user has to move his or her finger or the like away from the other end of the screen, then touch the one end of the screen again with his or her finger, and move his or her finger or the like from the one end of the screen to the other end of the screen to rotate the image more. In this case, if moving to the attention point is performed immediately after the user moves his or her finger away from the other end of the screen, the user cannot touch the one end of the screen again with his or her finger. This may prevent the user from preforming his or her desired operation. For this reason, in step S105, the attention point display unit 43 determines whether a predetermined time period has elapsed since the end of operation is detected in step S104, to prevent the viewer's operation from being obstructed. The elapse of a predetermined time period without no operation is an example of a "predetermined trigger". Other examples of the "predetermined trigger" include detecting that an operation is performed on an area other than a display area of the spherical image 6 on the screen of the terminal apparatus 30. In another example, a determination result in step S104 indicating that the operation by the viewer on the spherical image 6 ends is determined as the "predetermined trigger". In this case, the process of step S105 is omitted. When the attention point display unit 43 determines that the predetermined time period has not elapsed since the end of the operation (S105: NO), the operation returns to step S102.

When the attention point display unit 43 determines that the predetermined time period has elapsed since the end of the operation (S105: YES), the attention point display unit 43 determines whether the attention point P is included in the display region (S106). When the attention point display unit 43 determines that the attention point P is included in the display region (S106: YES), the operation proceeds to step S109, because the attention point P is already within the display region.

When the attention point display unit 43 determines that no attention point P is included in the display region (S106: NO), the attention point display unit 43 calculates a score for each of the attention points P (S107).

Then, the attention point display unit 43 displays the attention point P having the highest score (S108).

After displaying the attention point P for a certain time period, the attention point display unit 43 starts to rotate the spherical image 6 based on the display pattern (S109). This brings about continuous movement of the spherical image 6, thereby drawing attention of the viewer. In one example, the display of the attention points based on the display pattern is repeatedly performed. In another example, the display of the attention points based on the display pattern is repeated a predetermined number of times. In still another example, the rotation of the spherical image 6 is not started.

Although in FIG. 17, a description is given of an example in which the attention point P to be displayed is determined based on the score, the attention point P can be determined according to any of the rules (i) to (iv). In this case, the processes from step S107 to step S108 changes depending on how the attention point P to be displayed is determined.

As described heretofore, in the image display system 100 according to the present embodiment, the attention point P is automatically displayed in the display region. This enhances an effect of advertisement. For example, a click-through rate increases. Further, the viewer's workload of operation is reduced.

<<Including Plural Attention Points in Display Region>>

Figure 18A:
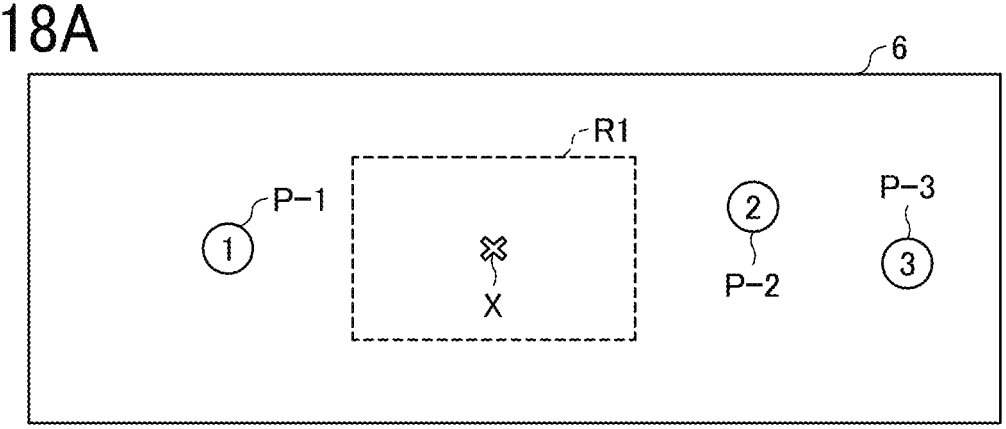
FIGS. 18A to 18C are illustrations for explaining a process of displaying plural attention points P, according to an embodiment of the present disclosure.
Figure 18B:
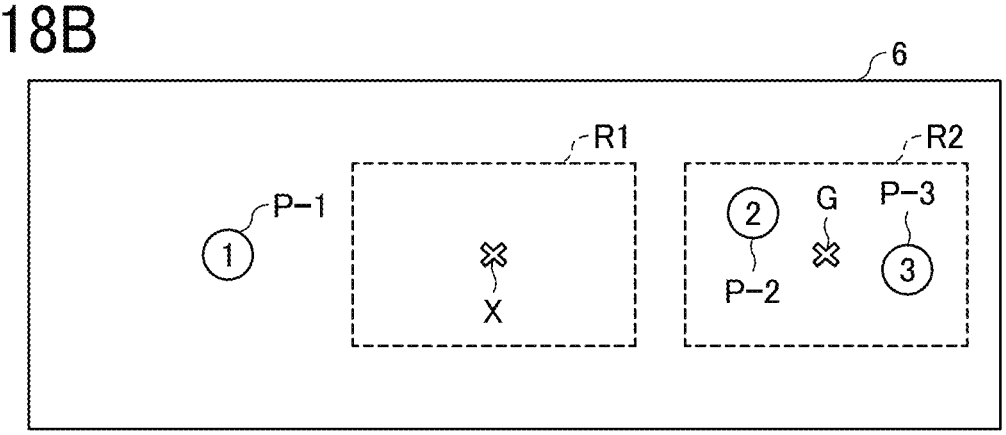
Figure 18C:
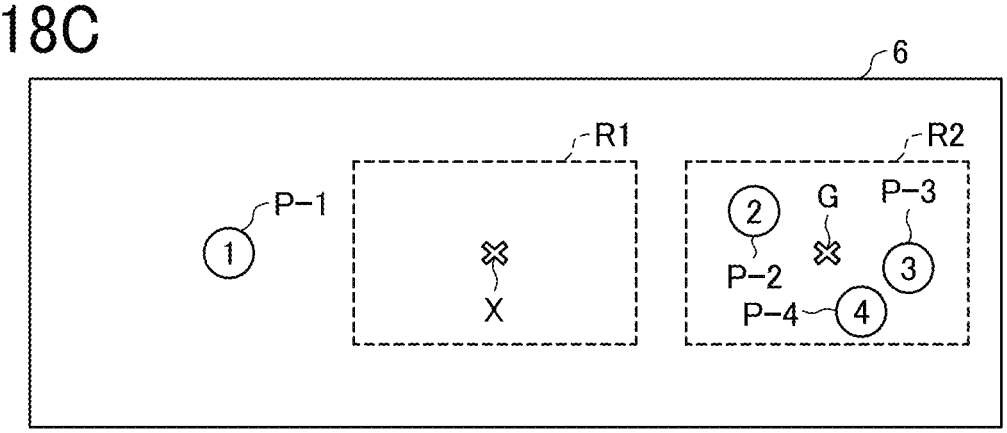

FIGS. 18A to 18C are illustrations for explaining a process of displaying plural attention points P. In FIG. 18A, a current display region R1 include not attention point P. There are three attention points P in total. If the attention point P-2 and the attention point P-3, which is apart from the attention point P-2 by a short distance, are included in one display region, the viewer can view the two attention points P-2 and P-3 simultaneously. Therefore, in determining the attention point P to be displayed in the display region, the attention point display unit 43 calculates the distance between the attention points P. If there are two attention points which away from each other by a distance equal to or shorter than a threshold value, the attention point display unit 43 regards the two attention points as one attention point. In the example of FIG. 18A, the attention points P-2 and P-3 are regarded as one attention point P.

As illustrated in FIG. 18B, the attention point display unit 43 calculates a centroid G between the two attention points P-2 and P-3, and determines the centroid G as a center of a display region R2. In one example, the display region R2 is determined as a circumscribed rectangle of the angle of view attached to the attention points P-2 and P-3. In another example, the display region R2 has any suitable shape as long as the attention points P-2 and P-3 is included in the display region R2 and there is a slight margin between the contour of the display region R2 and the attention point P-2 and P-3.

The same process is performed on three or more attention points P. In an example of FIG. 18C, the distance between the attention point P-2 and the attention point P-3 is less than the threshold value. An attention point P-4 is away from the attention point P-3 by a distance less than the threshold value. (The distance between the attention point P-4 and the attention point P-2 is equal to or longer than the threshold value). Therefore, the attention point display unit 43 calculates a centroid G among the attention points P-2, P-3 and P-4 and determines the centroid G as the center of the display region R2.

<<How to Rotate Spherical Image 6 when Displaying Attention Points P>>

Figure 19A:
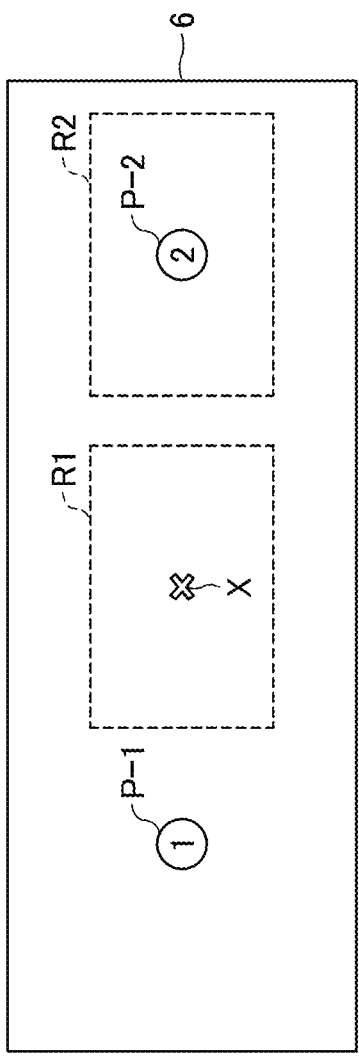
Figure 19B:
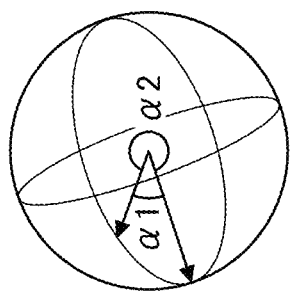
Figure 19C:
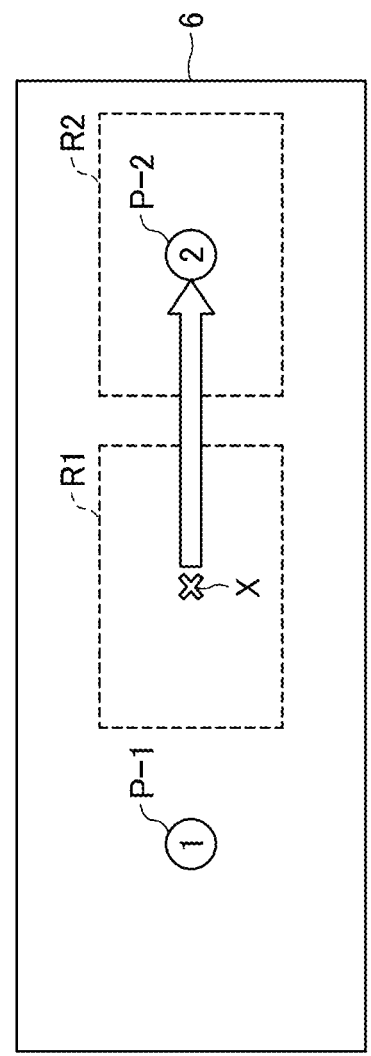

FIGS. 19A to 19E are illustrations for explaining examples of how the spherical image 6 is rotated to display the attention point P. In FIG. 19A, the attention point display unit 43 rotates the spherical image 6 such that the direction of line of sight moves from a center X of the display region R1 currently being displayed to the attention point P-2. In one example, the spherical image 6 is rotated in the shortest distance so that the movement amount is the smallest. The attention point display unit 43 calculates an angle of view defined by a straight line connecting the center of the sphere and the center X of the display region R1 and a straight line connecting the center of the sphere and the attention point P-2. As illustrated in FIG. 19B, since the spherical image 6 has a spherical shape, two angles of view are obtained: one is α1 of less than 180 degrees, and the other is α2 of 180 degrees or more. Unless the angle of view α1 is equal to the angle of view α2, either one of the two angles of view is less than 180 degrees. As illustrated in FIG. 19C, the attention point display unit 43 rotates the spherical image 6 such that the direction of line of sight moves from the center X to the attention point P-2 via a path of an arc having the angle of view of less than 180 degrees.

In another example, as illustrated in FIG. 19C, the attention point display unit 43 rotates the spherical image 6 such that the direction of line of sight moves from the center X to the attention point P-2 via a path of an arc having the angle of view of 180 degrees or more. In other words, the amount of rotation of the spherical image 6 is intentionally increased. Thus, the advertiser can have the viewer view a larger number of parts of the spherical image 6.

In still another example, as illustrated in FIG. 19E, the attention point display unit 43 rotates the spherical image 6 via a path by 360 degrees or more to display the attention point P-2. As a result, the attention point P-2 is displayed twice. This enables a viewer the attention point P-2 with leisure, after recognizing that that the viewer viewed almost the entire spherical image 6. As described with reference to FIGS. 19D and 19E, the attention point display unit 43 can display the attention point P2 by rotating the spherical image 6 via a path other than the shortest path.

Figure 20A:
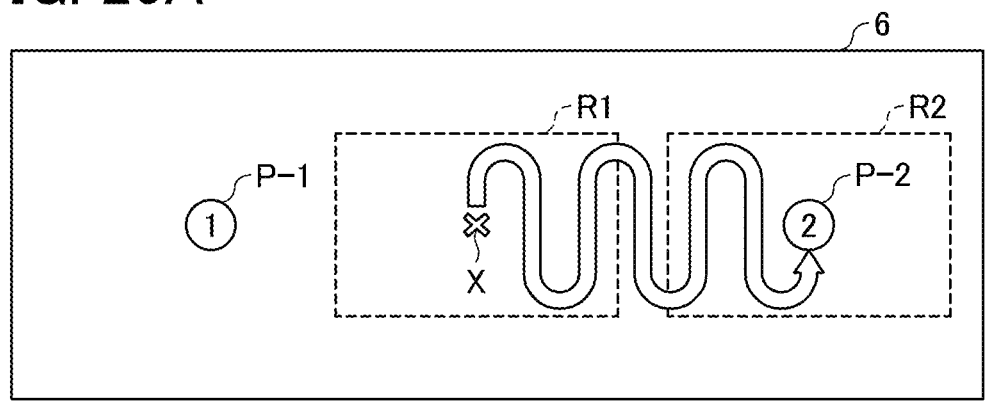
FIGS. 20A and 20B are illustrations for explaining examples of how the spherical image is rotated to display the attention point P, according to an embodiment of the present disclosure.

In still another example, the attention point display unit 43 can rotate the spherical image 6 such that a direction of a line of sight moves up and down, instead of rotating the spherical image 6 linearly. FIG. 20A is an illustration of example in which the spherical image 6 is rotated such that the direction of line of sight moves up and down. Thus, the advertiser can have the viewer view a larger number of parts of the spherical image 6. In addition, since the movement is sophisticated, this display manner attracts more attention of the viewer.

Figure 20B:
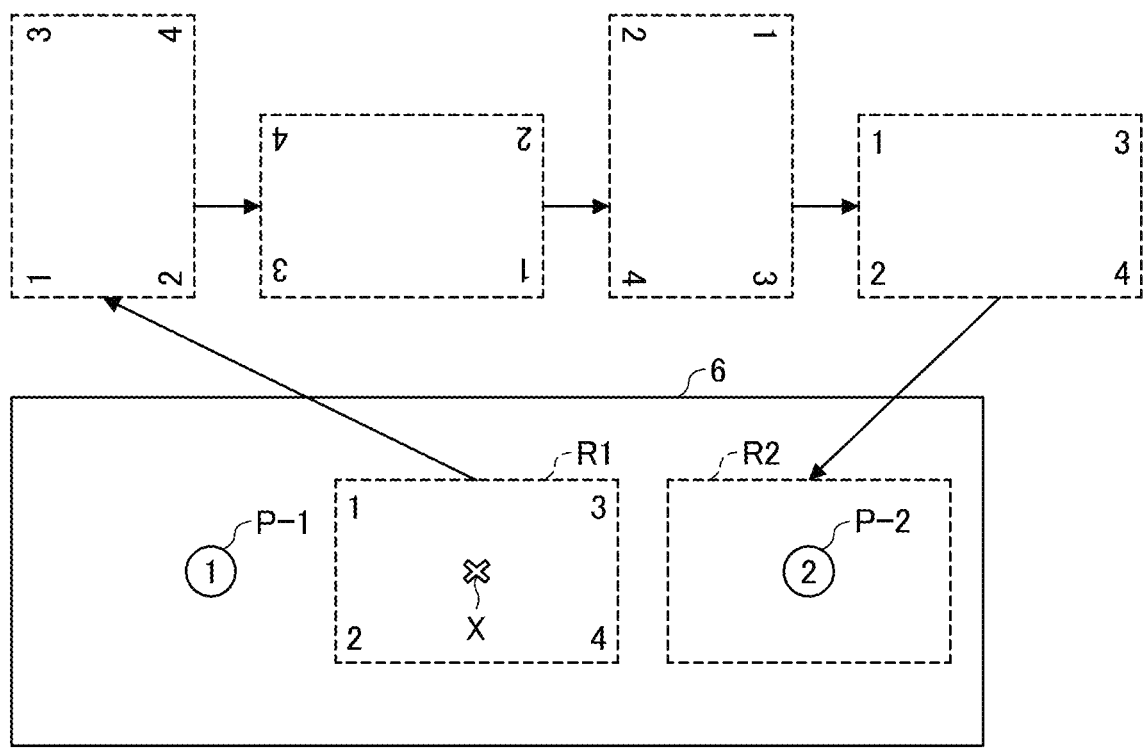

In still another example, as illustrated in FIG. 20B, the attention point display unit 43 can rotate the spherical image 6 horizontally such that the display region R1 moves to a direction of the attention point P-2 while rotating the display region R1 about the direction of line of sight. In FIG. 20B, the display region R1 is rotated in a counterclockwise direction. The numeral numbers 1, 2, 3 and 4 are numbers illustrated for explaining the rotation, and they are not reference numerals. The attention point display unit 43 also moves the display region R1 in a horizontal direction while rotating it in the counterclockwise direction to display the attention point P-2 at the center of a display region. This makes a displayed image vary widely until the attention point P-2 is displayed, thereby attracting more attention of the viewer.

In another example, the attention point display unit 43 rotates the display region R1 in a clockwise direction. In still another example, instead of rotating the display region R1 while moving it, the attention point display unit 43 can rotate the display region R2 after displaying the display region R2. Further, the processes of rotating the spherical image 6 as <<Displaying Plural Attention Points in Order>>

Figure 21A:
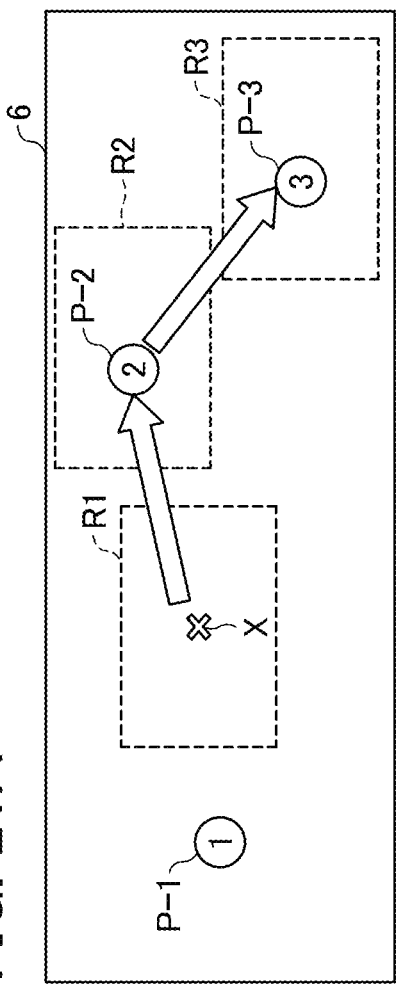
FIGS. 21A and 21B are illustrations for explaining examples of how plural attention points P are displayed in order, according to an embodiment of the present disclosure.
Figure 21B:
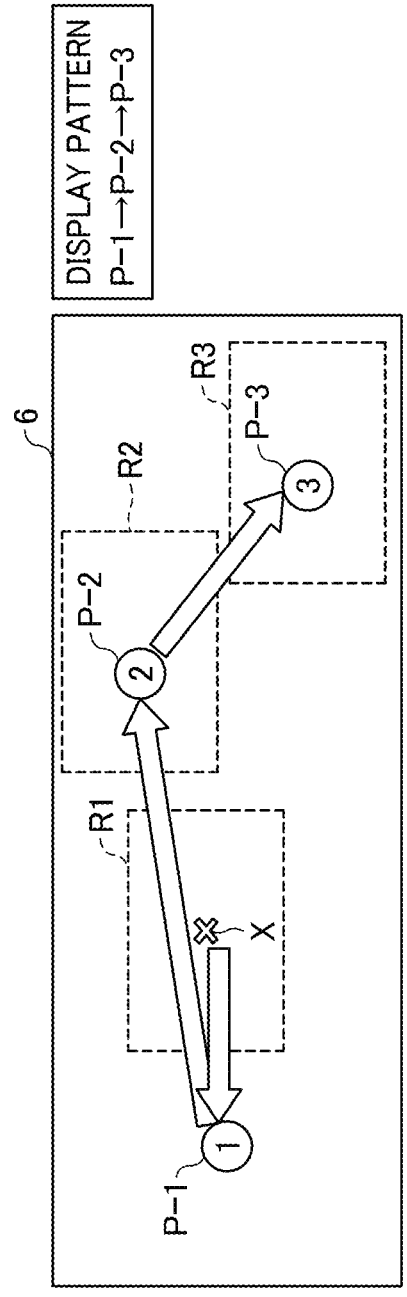

FIGS. 21A and 21B are illustrations for explaining examples of how plural attention points P are displayed in order. The spherical image 6 includes three attention points P-1, P-2 and P-3. For example, the attention point display unit 43 determines that the spherical image 6 is to be rotated such that the direction of line of sight is moved from the center X of the current display region R1 to the attention point P-3, based on the above-described rules (i) to (xi) or the score obtained as described above. In this case, as illustrated in FIG. 21A, instead of rotating the spherical image 6 such that the direction of line of sight is moved directly to the attention point P-3, the attention point display unit 43 displays the attention point P-3 after displaying the attention point P-2. As a result, in addition to displaying the attention point P-3 to be displayed preferentially, the point attention point P-2 can also be displayed. Thus, the advertiser can have the viewer view many attention points P. In another example, the attention point display unit 43 can rotate the spherical image 6 such that the direction of line of sight moves from the center X to the attention points P-1, P-2 and P-3 in order. In still another example, the attention point display unit 43 can display the attention point P-3 after displaying a larger number of other attention points P.

Further, as illustrated in FIG. 21B, a display pattern attached to the spherical image 6 can be used. In an example of FIG. 21B, the display pattern defining a display order to the attention points P-1→P-2→P-3 is attached to the spherical image 6. When no attention point P is included in the display region R1 currently being displayed, the attention point display unit 43 displays the attention points P-1, P-2 and P-3 in order as defined in the display pattern. In another example, the attention point display unit 43 can display the attention point P-3 after displaying the attention point closest to the center X of the display region R1 currently displayed or the attention point (e.g., the attention point P-2) having a highest score. As a result, all the attention points P are displayed. Thus, the advertiser can have the viewer view many attention points P.

In still another example, the terminal apparatus 30 randomly determine an order in which plural attention points P are to be displayed and displays the plural attention points P in the determined order.

<Displaying Attention Point P According to Operation by Viewer>

Instead of automatically displaying attention point P when no attention point P is included in the display region R1, the attention point display unit 43 can display the attention point P in response to an operation by the viewer.

Figure 22:
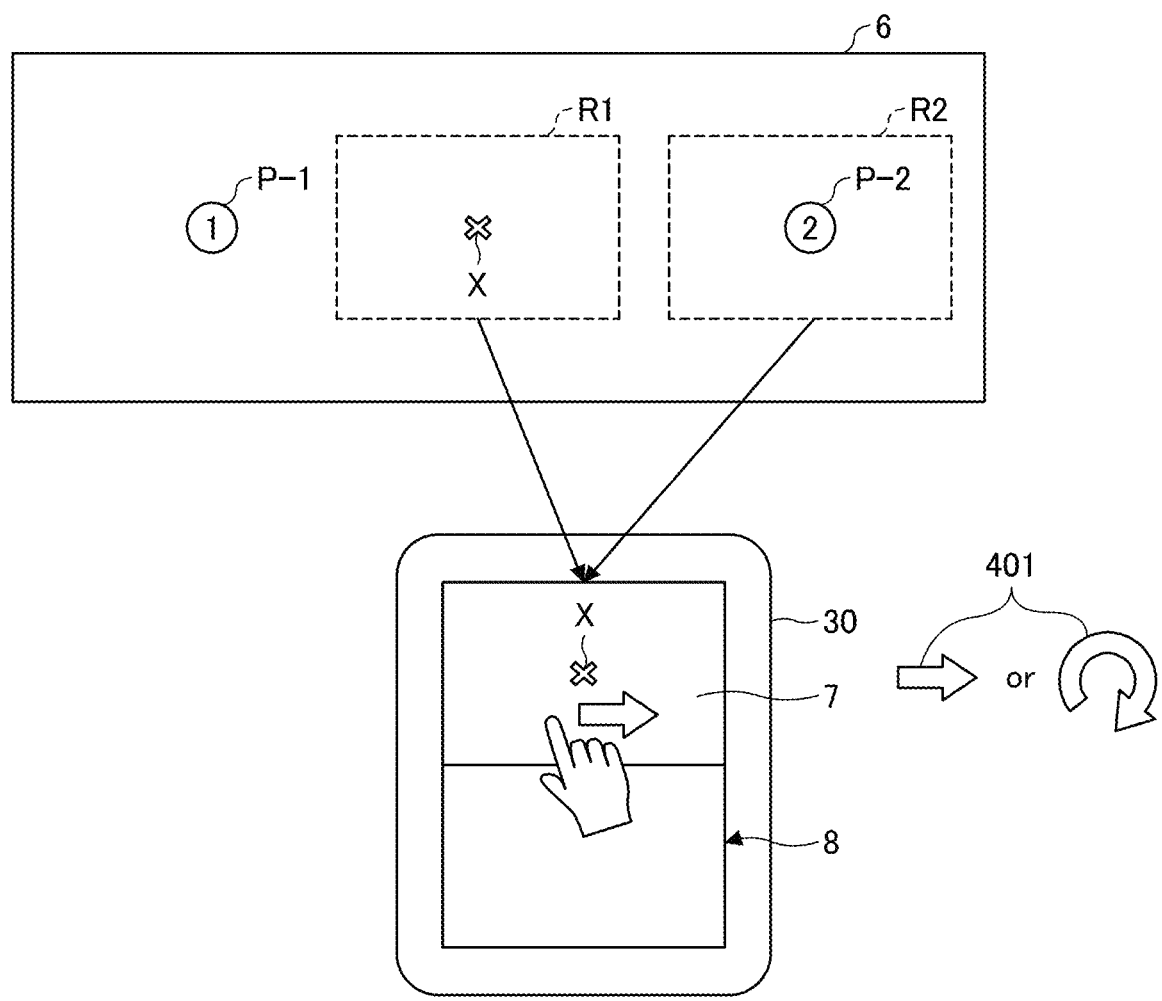
FIG. 22 is an illustration for explaining an example of how the attention point P is displayed in response to an operation by a viewer, according to an embodiment of the present disclosure.

FIG. 22 is an illustration for explaining an example of how the attention point P is displayed in response to an operation by the viewer. In an example of FIG. 22, the terminal apparatus 30 displays the attention point P-1 immediately after receiving the advertisement data. Then, the viewer operates the terminal apparatus 30 to rotate and/or enlarge or reduce the spherical image 6 to cause the terminal apparatus 30 to display the display region R1. When the viewer flicks or swipes the spherical image 6 in the right direction in the state where the display region R1 is being displayed, the operation receiving unit 34 receives this operation by the viewer. The attention point display unit 43 displays the attention point P-2, which is present in the right direction, according to the viewer's operation received by the operation receiving unit 34. Since the center X of the display region R1 and the attention point P-2 are not always at the same height (latitude), the attention point display unit 43 displays the attention point P that is present in the longitude direction corresponding to the flicked or swiped direction. Further, the spherical image 6 can rotate not only in the longitude direction but also in the latitude direction. When the viewer flicks or swipes in the upward or downward direction, the relation between latitude and longitude is reversed. Further, when the viewer flicks or swipes in a diagonal direction, the operation receiving unit 34 determines that the flick or swipe has been made in a direction corresponding to a horizontal component or a vertical component that is greater than the other in the flicked or swiped direction.

The terminal apparatus 30 also can display the attention point P according to an operation 401 by gesture, as illustrated in FIG. 22. For example, the viewer shakes or moves the terminal apparatus 30 in the right direction. Since the terminal apparatus 30 is rotated about a vertical axis of the terminal apparatus 30 according to the operation of shaking, a gyroscopic sensor in the terminal apparatus 30 can detect the shaking operation. Further, since acceleration to the right direction is generated according to the viewer's operation of moving the terminal apparatus 30, the acceleration and orientation sensor 306 can detect the viewer's operation of moving the terminal apparatus 30. The operation receiving unit 34 receives the operation 401 by the gesture, and the attention point display unit 43 displays the attention point P-2 that present in the right direction.

In a case of the operation 401 by the gesture, the viewer does not have to use his or her finger. Accordingly, there is an advantage that the next attention point P can be displayed while the viewer holds the terminal apparatus 30 in only one hand. When the terminal apparatus 30 is shaken or moved in the upward or downward direction, substantially the same process as described above with respect to the flicking or swiping operation is performed.

The attention point P can be displayed in response to an operation by the viewer not only when no attention point is displayed in the display region R1 but also when the attention point is displayed in the display region. In this case, plural attention points P can be displayed one after another in response to a simple operation by the viewer such as shaking or moving the terminal apparatus 30. Accordingly, the viewer can view all the attention points P in a simple manner.

Figure 23:
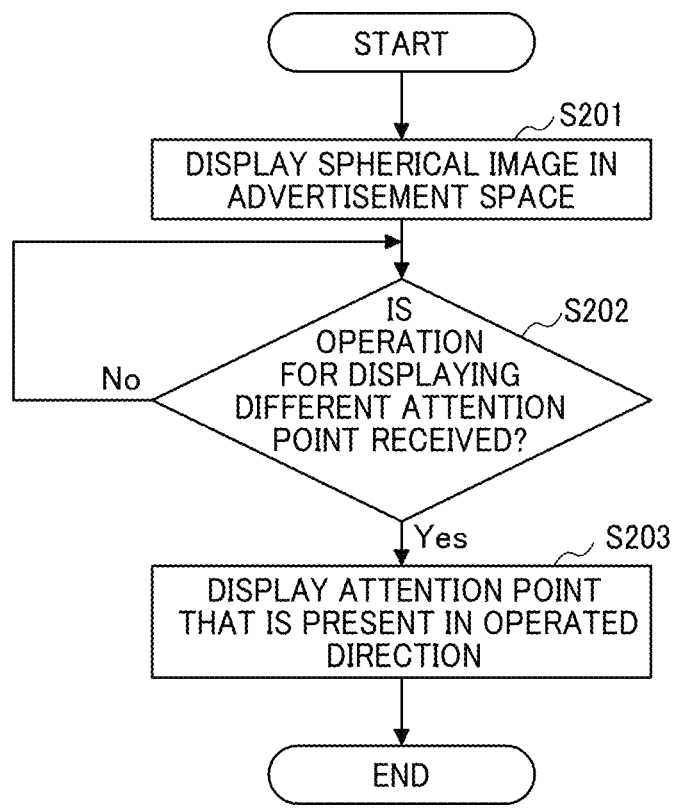
FIG. 23 is a flowchart illustrating an example of an operation of displaying the attention point by the attention point display unit, according to an embodiment of the present disclosure.

FIG. 23 is a flowchart illustrating an example of an operation of displaying the attention point P by the attention point display unit 43. The advertisement display unit 40 displays the spherical image 6 included in the advertisement data transmitted from the image distribution apparatus 10 in the advertisement space 7 (S201).

The operation receiving unit 34 determines whether an operation for displaying another attention point P is received (S202). The process at S202 is performed either when an attention point P is displayed in the display region or when no attention point is displayed in the display region. The operation for displaying another attention point is an operation of flicking or swiping in a certain direction as described above, or an operation of generating an angular velocity or acceleration. The operation for displaying another attention point is predetermined. The operation by the viewer is an example of a "predetermined trigger".

When the operation receiving unit 34 determines that no operation for displaying another attention point P is received (S202: NO), the operation returns to step S201. The operation receiving unit 34 waits until it receives an operation by the viewer.

When the operation receiving unit 34 determines that an operation for displaying another attention point P is received (S202: YES), the attention point display unit 43 displays an attention point P that is present in direction corresponding to the received operation (S203).

Thus, the image display system 100 according to the present embodiment can display the attention point P in response to a simple operation by the viewer, saving the viewer from the need of searching the attention point P.

<Determining whether Attention Point is Included in Display Region>

Figure 24A:
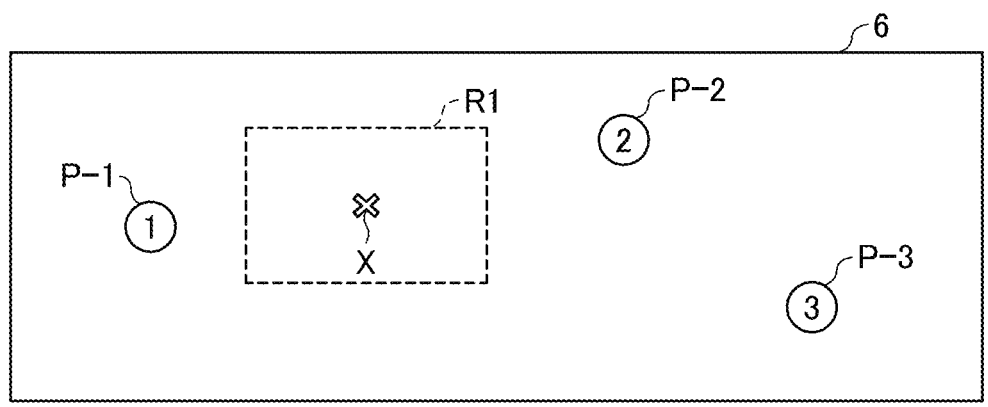
FIGS. 24A and 24B are illustrations for explaining an example of how determination as to whether the attention point P is included in a display region is made, according to an embodiment of the present disclosure.
Figure 24B:
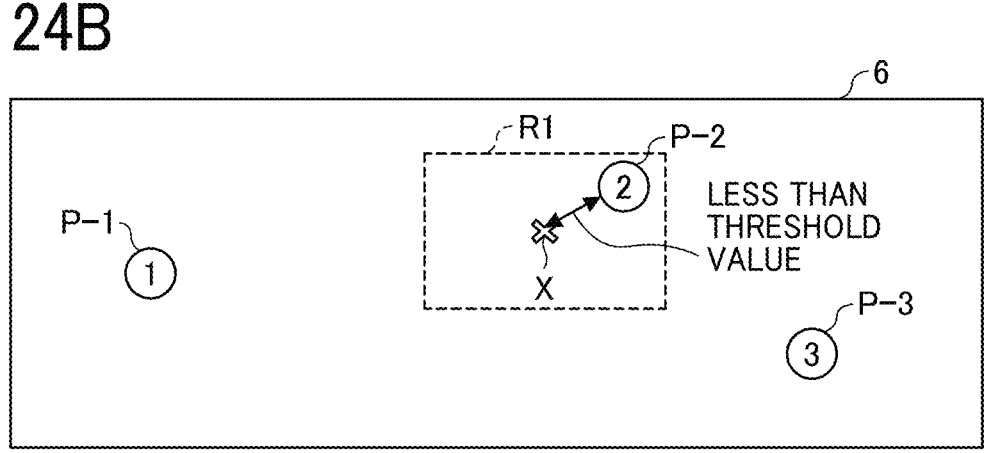

FIGS. 24A and 24B are illustrations for explaining an example of how determination as to whether an attention point P is included in the display region R1 is made. In FIG. 24A, no attention point P is obviously included in the display region R1. It is determined that no attention point P is included in the display region R1 by comparing the coordinates of the four vertices of the display region R1 and the coordinates of the attention points P.

In FIG. 24B, the attention point P-2 is included at the edge of the display region R1 currently being displayed. Although the attention point P-2 is a point, the attention point P-2 as an image covers a certain area. For this reason, only a part of elements to which attention is to be focused indicated by the attention point P-2 is displayed in the display region R1. In such case, if elements to which attention is to be focused of the attention point P-2 is displayed (i.e., if the entire attention point P-2) is displayed, an advertisement will be more appealing. For this reason, when the attention point P-2 is included at edge of the display region R1 as illustrated in FIG. 24B, the attention point display unit 43 can determine that the attention point P-2 is not included in the display region R1. Thus, the advertiser can have the viewer view the entirety of the attention point P.

Specifically, the attention point display unit 43 compares the coordinates of the edge portion of the display region R1 with the coordinates of the attention point P-2. When a difference (angle of view) obtained by the comparison is less than a threshold value, the attention point display unit 43 determines that the attention point P-2 is not included in the display region R1, even when the attention point P-2 is included in the display region R1 in fact. The determination process as described is just one example. In another example, when the attention point P-2 is included in the display region R1, the attention point display unit 43 simply determines that the attention point P-2 is included in the display region R1.

<Enlargement and Reduction>

In the present embodiment, the angle of view is attached to each of the attention points P. The next attention point P is displayed at the angle of view attached to the attention point P. Therefore, when the angle of view of the current display region R1 is different from the angle of view of the attention point P to be displayed next, the spherical image 6 in the advertisement space 7 is enlarged or reduced.

Figure 25A:
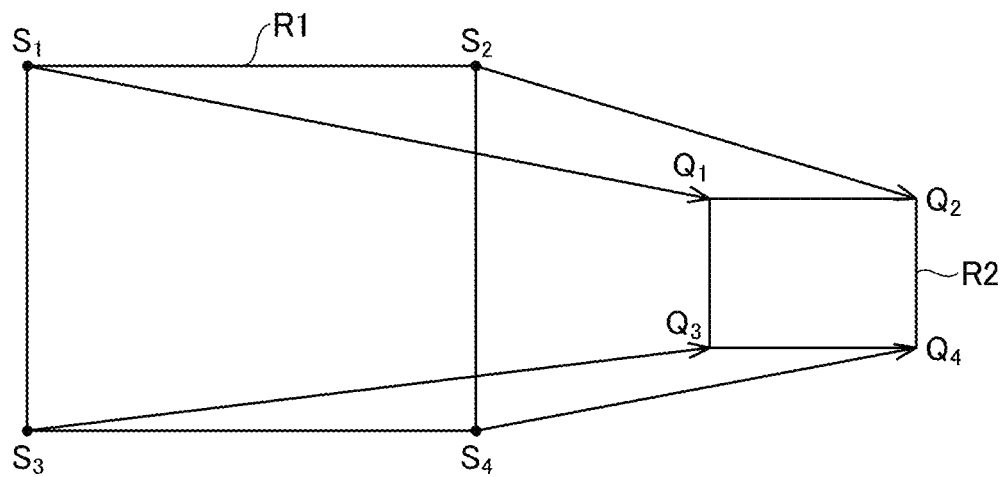
FIGS. 25A and 25B are illustrations for schematically explaining enlargement or reduction of the spherical image, according to an embodiment of the present disclosure.
Figure 25B:
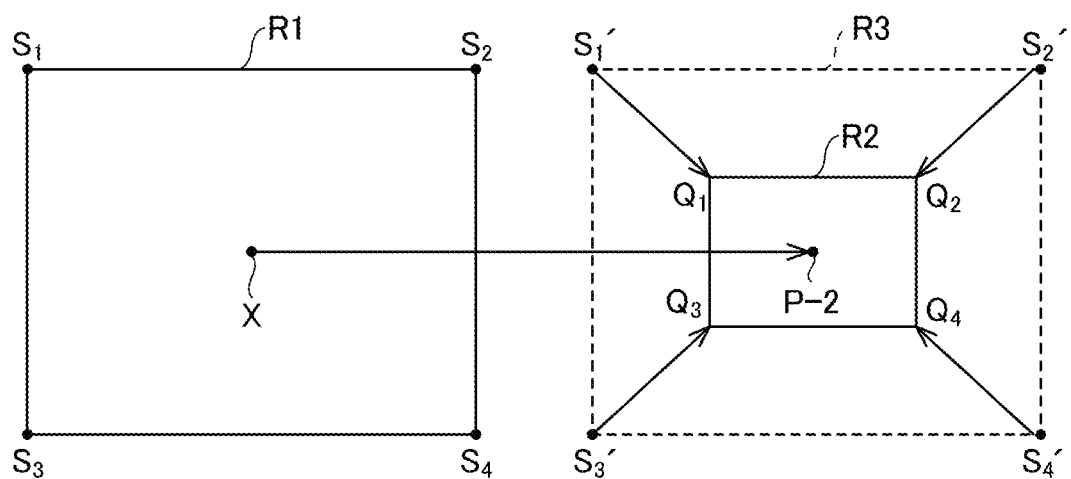

FIGS. 25A and 25B are illustrations for schematically explaining the enlargement or reduction of the spherical image 6. FIG. 25A illustrates a display process in which the enlargement is performed concurrently with moving of the display region R1. FIG. 25B illustrates a display process in which the enlargement is performed after moving of the display region. Since the angle of view is reduced by moving from the display region 1 to the display region 2, in the examples of FIGS. 25A and 25B, the spherical image 6 in the advertisement space is enlarged. Also, in a case of the reduction of the spherical image 6, substantially the same process as described below with respect to the enlargement of image is performed.

Hereinafter, a description is given of the display process of FIG. 25A. The attention point display unit 43 specifies the four vertices S1 to S4 of the display region R1 currently being displayed. The coordinates of the four vertices Q1 to Q4 of the angle of view of the attention point P-2 can be calculated based on the coordinates of the attention point P-2 and the angle of view. Alternatively, the vertices Q1 to Q4 may be determined in advance. The terminal apparatus 30 divides (interpolates) each of curve lines on a sphere (on the surface of the celestial sphere) connecting S1 and Q1, S2 and Q2, S3 and Q3, and S4 and Q4 into a given number of curve lines. Then, the terminal apparatus 30 displays the spherical image 6 using the coordinates and the angle of view of each of the division points. With this process, the display region R1 of the spherical image 6 is smoothly moved and reduced to the angle of view of the attention point P-2, and the attention point P is displayed at the specific angle of view.

Hereinafter, a description is given of the display process of FIG. 25A. The attention point display unit 43 divides (interpolates) each of curve lines on the sphere connecting the center X of the display region R1 and the attention point P-2 to a given number of curve lines. Then, the attention point display unit 43 displays the spherical image 6 using the coordinates of each of the division points and the current angle of view (constant). As a result, four vertices S1' to S4' of the angle of view of the attention point P-2 having the same angle of view as that of the display region R1 defines a display region R3. The coordinates of four vertices Q1 to Q4 according to an original angle of view of the attention point P-2 can be calculated (or determined in advance).

The attention point display unit 43 divides curve lines on the sphere connecting S and Q1, S2' and Q2, S3' and Q3, and S4' and Q4 into a given numbers of curve lines. Then, the attention point display unit 43 displays the spherical image 6 using the angle of view of each of the division points. With this process, the display region R1 of the spherical image 6 moves to the display region R3 smoothly, and thereafter the angle of view is reduced to the display region R2. As a result, the spherical image 6 can be displayed as being enlarged.

One of these two displaying processes, which makes an advertisement more appealing, is set in the image distribution apparatus 10 in advance. In another example, the number of clicks is counted for each of these two display processes, each process being one type of the display pattern. In this case, one of the two display processes, for which the higher number of clicks is counted, is adopted.

<Variation of Displaying Attention Point P>

In the above description, the attention point P not included in the display region R1 is displayed by rotating the spherical image 6. Further, in the above, a description is given of an example of display process in which the attention point display unit 43 enlarges or reduces the spherical image 6 while rotating the spherical image. Furthermore, in the above, a description is given of another example of display process in which the attention point display unit 43 enlarges or reduces the spherical image 6 after rotating the spherical image. In addition to the above-described display process, the attention point display unit 43 can display the attention point P not included in the display region R1 only by enlargement.

FIGS. 26A to 26D are illustrations for explaining an example how the attention point P is displayed only by enlargement. In FIG. 26A, no attention point P is displayed in the display region R1. The attention point display unit 43 can include the attention point P in the display region R2 by enlarging the angle of view without moving the center X of the display region R1.

FIG. 26B illustrates an example of the spherical image 6 in which the display region R2 is displayed by enlarging the angle of view without moving the center X of the display region R1. As a result of the enlargement of the angle of view, the display region R2 includes the attention point P2. As described, the attention point display unit 43 can display the attention point P only by enlarging the angle of view. The enlargement of the angle of view corresponds to the reduction of the spherical image 6 in the advertisement space 7.

The attention point display unit 43 enlarges the angle of view either until the display region R2 includes the attention point P-2 nearest to the center X of the display region R1 or until the display region R2 includes the entirety of the angle of view of the attention point P-2. FIG. 26C illustrates the spherical image 6 in which the angle of view is enlarged such that the display region R2 includes the entirety of the angle of view of the attention point P-2.

FIG. 26D illustrates the spherical image 6 in which the display region R2 includes the entirety of the spherical image 6. Such a display form is called a "little planet". The "little planet" is a display form peculiar to the spherical image 6. Accordingly, it can be said that the "little planet" makes advertisement more appealing to a viewer.

<Movement Speed>

Figure 27A:
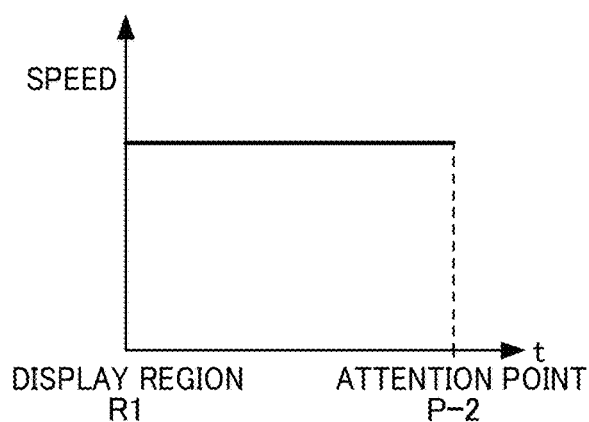
FIGS. 27A to 27D are illustrations for explaining examples of a movement speed from a center of the display region to the next attention point, according to an embodiment of the present disclosure.

FIGS. 27A to 27D are illustrations for explaining examples of a movement speed from the center X of the display region R1 to the next attention point P-2. FIG. 27A illustrates a movement speed when the terminal apparatus 30 rotates the spherical image 6 such that a direction of line of sight moves from the center X of the display region R1 to the attention point P-2 at a constant speed. In this case, a display region is moved to the next attention point P at the highest speed.

Figure 27B:
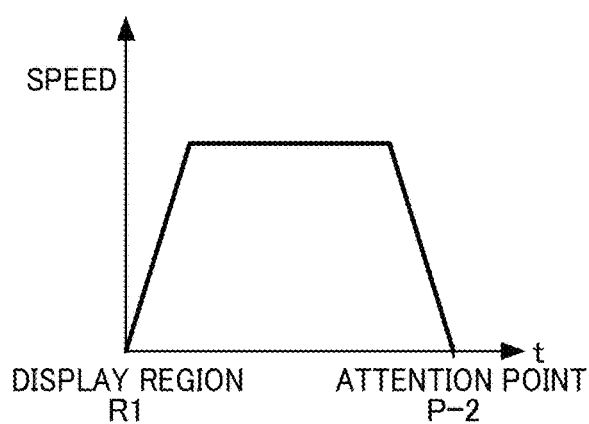

FIG. 27B illustrates another example of the movement, in which the movement speed gradually increases from the movement start point, i.e., the center X of the display region R1, then the movement speed becomes constant, and then the movement speed gradually decreases before the movement end point, i.e., the next attention point P-2. Since an abrupt movement is prevented, there is an advantage that the displayed image is suitable for viewing.

Figure 27C:
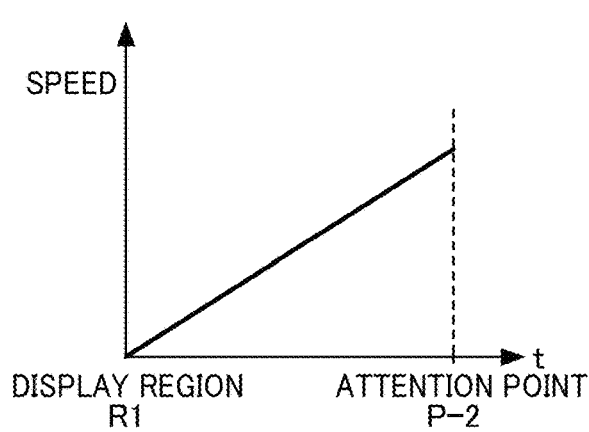

FIG. 27C illustrates another example of the movement, in which the moving speed gradually increases from the start point, i.e., the center X of the display region R1 to the end point. i.e., the attention point P-2. Abrupt movement at the beginning of movement can be prevented.

Figure 27D:
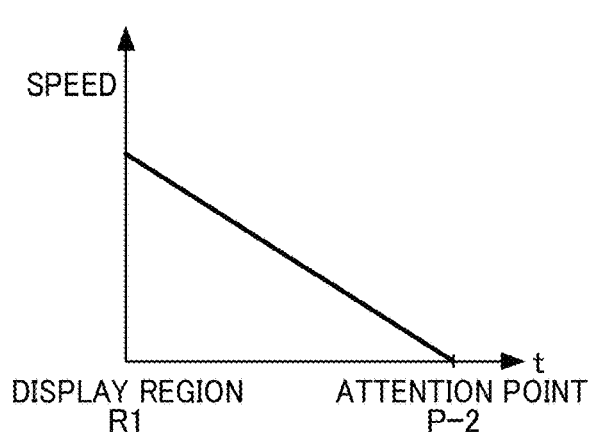

FIG. 27D illustrates another example of the movement, in which the moving speed gradually decreases from the start point, i.e., the center X of the display region R1 to the end point. i.e., the attention point P-2. Since the moving speed gradually decreases before the attention point P-2, the viewer can view the next attention point P for a long time.

One process of rotating the spherical image 6, which makes an advertisement most appealing, from among these four processes, is set in the image distribution apparatus 10 in advance. In another example, the number of clicks is counted for each of these four processes of rotating the spherical image 6, each process being one type of the display pattern. In this case, one of the four rotating processes, for which the higher number of clicks is counted, is adopted.

<Displaying Attention Points P After Displaying Display Region R2 Including Attention Point>

As described heretofore, a specific attention point P can be displayed in various ways. After the attention point display unit 43 displays the specific attention point P, the attention points included in the spherical image 6 are displayed automatically according to the display pattern as described above.

FIG. 28 is an illustration of an example of how the attention points P are displayed according to the display pattern. As illustrated in FIG. 28, the display pattern held by the spherical image 6 is the attention points P-1→P-2→P-3→P-4. In a case where a specific attention point P is to be displayed automatically without an operation by a viewer, it is assumed that the attention point P-2 is identified as the specific attention point based on the distance from the center X of the display region R1, the scores or the like. In another example, the first attention point P-1 can be identified as the specific attention point. After displaying the attention point P-2 without motion for a predetermined time period, the attention point display unit 43 determines another specific attention point P to be displayed subsequently to the displayed attention point P-2 based on the display pattern and displays the determined another specific attention point P. All the attention points P defined in the display pattern are displayed. After displaying all the attention points P, the attention point P are repeatedly displayed according to the display pattern.

In addition, in a case where a specific attention point P is displayed according to an operation by a viewer, the attention points P can be displayed one after another according to the display pattern, after displaying the specific attention point P determined in response to the operation by the viewer.

In a case where no operation is input by the viewer or in a case where the specific attention point P is displayed in response to the operation by the viewer, when an operation by the viewer is detected while the display of the attention points P based on the display pattern is performed, the attention point display unit 43 stops displaying the attention points P based on the display pattern. In one example, in a case where the attention point display unit 43 is rotating the spherical image 6 to display the next attention point P, the attention point display unit 43 displays the next attention point P. In another example, the attention point display unit 43 stops rotating the spherical image 6 at an angle of view of the timing when the operation is detected, even when no attention point P is included in the display region.

Displaying attention points P as illustrated in FIG. 28 is not necessarily based on the display pattern. In another example, the attention points P are randomly displayed. In still another example, the viewer can determine the display pattern.

<Distribution of Video Image as Spherical Image>

According to the image display system 100 of the present embodiment, movement is added to a still image. As a result, the image display system 100 can display a still image like a video image. At a first glance, a viewer cannot tell whether the distributed advertisement is a still image or a video image. Therefore, an effect like a video image is bring about with less communication load.

On the other hand, in some cases, the spherical image 6 configured as a video image is distributed. The video image refers to an image having a plurality of frames, captured at different timings. In one example of the video image, an image capturing position and a subject hardly moves. In another example of the video image, at least one of the image capturing position and the subject moves. In a case where neither the image capturing position nor the subject moves, the position of the attention point P does not move. Accordingly, the attention points P are displayed in substantially the same manner as a still image. In other words, the attention point P in a frame captured at a different timing is displayed.

In a case of a video image in which at least one of the image capturing position and the subject changes with the elapse of time, an attention point P is extracted from each of the frames captured at different timings. Accordingly, the terminal apparatus 30 can display a larger number of attention points P. Thus, the advertiser can have the viewer view an exact attention point P to which attention is to be paid from the frames of the video image.

<Summary of Embodiment>

In the conventional art, an attention point in an image is not always displayed to a viewer. For example, according to a conventional art, although images change in a preset order in a video image, it is difficult to positively cause desired attention point(s) in a video image to be displayed to the viewer.

Further, imaging apparatuses are improved to have advanced functions. For example, imaging apparatus having a large angle of view are now widely used. In addition, imaging apparatuses capable of imaging a super wide-angle range using a fisheye lens and the like are gradually spreading. Since an image captured by such wide-angle imaging apparatuses has a wide angle of view, there are cases in which viewers sometimes cannot find an attention point or a provider of the image cannot present an attention point to viewers.

As described heretofore, in the image display system 100 according to the present embodiment, the attention point P is automatically displayed in the display region. This enhances an effect of advertisement. For example, a click-through rate increases. Further, the viewer's workload of operation is reduced. In addition, the viewer can display the attention point P in the display region with a simple operation. In addition, a still image is displayed like a video image. Further, in the image display system 100 of the present embodiment, since the position of the attention point P is not displayed in a pop-up manner on an image, the image to be displayed can be displayed as it is.

<Variation>

The above-described embodiment is illustrative and do not limit the present disclosure. Thus, numerous additional modifications and variations are possible in light of the above teachings. Any one of the above-described operations may be performed in various other ways, for example, in an order different from the one described above.

For example, although in the above-described embodiment, a description is given of an example in which the spherical image 6 is displayed in the advertisement space 7, the spherical image 6 may not be displayed as an advertisement. For example, the attention point P in the spherical image 6 displayed on a given web page is displayed automatically or in response to the operation by the viewer. For example, the above-described embodiment can be applied to the spherical image 6 displayed on a social network service (SNS) application. Further, the above-described embodiment can also be applied to the spherical image 6 displayed on a digital signage. Furthermore, the above-described embodiment can be applied to the spherical image displayed by not only the information processing apparatus but also a television receiver. Therefore, although in the above-described embodiment, an advertiser provides an image, an individual user can provide the spherical image 6 that the user captured by himself or herself.

Furthermore, although in the above-described embodiment, a description is given of an example in which the spherical image 6 is used for an advertisement, the spherical image 6 can be used for any suitable purpose other than an advertisement.

Furthermore, an application of the terminal apparatus 30 used for displaying the spherical image 6 is not limited to the browser 8. Any suitable application software other than the browser 8 can be used to display the spherical image 6 and to display the attention point P automatically or in response to an operation by the viewer.

Furthermore, in addition to or instead of the above-described example in which the attention points P are set in advance, the terminal apparatus 30 as a distribution destination can detect all attention points P. In another example, the terminal apparatus 30 can add an attention point detected by the terminal apparatus 30 itself to the attention points P set in advance.

Further, as described above with reference to FIGS. 13A and 13B, in the above-described embodiment, the terminal apparatus 30 accesses the DSP 20, and then accesses the image distribution apparatus 10 to acquire the advertisement data. In another example, the DSP 20 can acquire the advertisement data directly from the image distribution apparatus 10 and then transmit the advertisement data to the terminal apparatus 30. In this case, since the terminal apparatus 30 can acquire the advertisement data by accessing the DSP 20 alone, a time period for displaying the advertisement can be shortened.

In still another embodiment, the DSP 20 and the image distribution apparatus 10 can be integrated, in which the DSP 20 distributes the advertisement data (the spherical image 6) to the terminal apparatus 30.

In still another embodiment, the advertisement distribution unit 12 can evaluate each display pattern using a click-through rate, in addition to or instead of the number of times of clicks. In still another embodiment, the advertisement distribution unit 12 can evaluate each display pattern using an evaluation index, such as the number of times of pressing of a "Like button".

In addition, although in the above embodiment, a description is given of an example in which the SSP 50, the DSP 20 and the image distribution apparatus 10 cooperate with each other to distribute an advertisement, any other suitable process can be performed until the terminal apparatus 30 displays the advertisement. For example, as a simple process, the partner site web server 60 can keep advertisement data from an advertiser and distribute the kept advertisement data to the terminal apparatus 30. In this case, the SSP 50, the DSP 20 and the image distribution apparatus 10 can be omitted.

Further, although in the above embodiment, a description is given of an example in which an image arranged on a web page is a full-view spherical image obtained by capturing 360 degrees around a celestial-sphere camera, the image arranged on the web page is not necessarily the full-view spherical image. For example, the image data arrange on the web page can be a wide-angle image. The wide-angle image of the present embodiment is an image having a portion that exceeds the advertisement space 7. For example, a panoramic image having an angle of view of about 180 degrees or more in a horizontal direction can be used as the wide-angle image. An image so-called a "panoramic image" can also be used as the wide-angle image.

Further, in the above, a description is given of an example in which the spherical image 6 is generated by combing two images, this is just an example. In another example, the spherical image 6 can be generated by layering overlapping portions of image data captured by gradually shifting image capturing directions. In other words, the spherical image 6 can be generated in any suitable manners.

In addition, the functional configuration of the image display system 100 are divided into the functional blocks as illustrated in FIGS. 10A and 10B, for example, based on main functions thereof, in order to facilitate understanding the processes performed by the image display system 100. No limitation is intended by how the processes are divided or by the name of the processes. The processes implemented by the image display system 100 can be divided to a larger number of processes depending on the contents of processes. Further, one process can be divided to include a larger number of processes.

The image distribution apparatus 10 is an example of a second information processing apparatus.

According to one or more embodiments of the present disclosure, a method is provided that enables a viewer to view an attention point of an image.

Each of the functions of the above-described embodiments may be implemented by one or more processing circuits or circuitry. The processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

What is claimed is:

1. A method of displaying a wide-angle image including one or more attention points on a display device, the method being performed by an information processing apparatus including the display device, the method comprising:
   detecting a predetermined trigger in a case that at least a part of the wide-angle image is displayed as a display region;
   in response to detecting the predetermined trigger, displaying a first region of the wide-angle image in the display region, the first region including at least one of the one or more attention points;
   recording an attention point that has been displayed from among the one or more attention points; and
   in a case that no attention point is included in the display region, displaying a second region of the wide-angle image in the display region, the second region including a particular attention point that has not yet been displayed.

2. The method of claim 1, further comprising:
   receiving an operation relating to display of the wide-angle image; and
   changing a region of the wide-angle image to be displayed in the display region in accordance with the operation, wherein
   the predetermined trigger is that no attention point is included in the display region in accordance with the operation.

3. The method of claim 1, further comprising:
   receiving an operation relating to display of the wide-angle image; and
   changing a region of the wide-angle image to be displayed in the display region in accordance with the operation, wherein
   the predetermined trigger is an elapse of a predetermined time period during which no operation is received, in a state in which no attention point is included in the display region.

4. The method of claim 1, further comprising:
   receiving an operation relating to display of the wide-angle image; and
   changing a region of the wide-angle image to be displayed in the display region in accordance with the operation, wherein
   the predetermined trigger is detection of receiving the operation, and
   the operation is for rotating or moving the information processing apparatus in a first state in which no attention point is included in the display region or in a second state in which the at least one of the one or more attention points is included in the display region.

5. The method of claim 1, wherein in the case that no attention point is included in the display region, the displaying displays, in the display region, a region including a first attention point that is closest to a current display region.

6. The method of claim 1, further comprising:
   recording a first attention point that is displayed most recently from among the one or more attention points, wherein
   in the case that no attention point is included in the display region, the displaying displays, in the display region, a region including the first attention point.

7. The method of claim 1, wherein
   the information processing apparatus is communicable with a second information processing apparatus via a network,
   the wide-angle image is transmitted from the second information processing apparatus to a plurality of information processing apparatuses including the information processing apparatus,
   the wide-angle image holds a number of times each of the one or more attention points is selected by the plurality of information processing apparatuses, and
   in the case that no attention point is included in the display region, the displaying displays, in the display region, a region including a first attention point that is selected for a largest number of times.

8. The method of claim 1, further comprising:
   recording at least one first attention point that has been already displayed from among the one or more attention points, wherein
   the wide-angle image holds information specifying a display order of a plurality of attention points including the one or more attention points, and
   in the case that no attention point is included in the display region, the method further comprises identifying a second attention point that is to be displayed subsequently to first particular attention point that is displayed most recently based on the display order, and the displaying displays, in the display region, a region including the second attention point identified.

9. The method of claim 1, wherein in a case that the displaying the first region including the at least one of the one or more attention points is performed by changing the display region of the wide-angle image, the displaying displays the first region in the display region via a path other than a path by which a movement amount is shortest.

10. The method of claim 1, wherein
the wide-angle image is a full-view spherical image, and
in a case that the displaying the first region including the at least one of the one or more attention points is performed by changing the display region of the wide-angle image, the displaying displays the first region in the display region via a path having a longer distance of a curve on a three-dimensional sphere.

11. The method of claim 1, wherein in a case that the displaying the first region including the at least one of the one or more attention points is performed by changing the display region of the wide-angle image, the displaying displays the first region in the display region via a path in which a full-view spherical image as the wide-angle image is moved by equal to or more than 360 degrees.

12. The method of claim 1, wherein in a case that the displaying the first region including the at least one of the one or more attention points is performed by changing the display region of the wide-angle image, the displaying further includes rotating the display region about a direction of line of sight.

13. The method of claim 1, wherein in a case that the displaying the first region including the at least one of the one or more attention points is performed by changing the display region of the wide-angle image, the displaying displays, in the display region, a region including a first attention point that is determined in advance by a preset method of determining any one of the one or more attention points to be displayed after displaying a second attention point different from the first attention point.

14. The method of claim 1, further comprising:
determining, in a case that a distance between one of the one or more attention points and another one of the one or more attention points is less than a threshold value, a centroid of the one of the one or more attention points and the another one of the one or more attention points, and
displaying the wide-angle image including the centroid in the display region.

15. The method of claim 1, wherein in a case that the displaying the first region including the at least one of the one or more attention points is performed by changing the display region of the wide-angle image, the displaying enlarges or reduces the wide-angle image while changing the display region, or enlarges or reduces the wide-angle image after displaying the wide-angle image including at least one of the one or more attention points in the display region.

16. The method of claim 1, wherein the displaying sequentially displays a plurality of attention points including the one or more attention points, after displaying the wide-angle image including at least one of the one or more attention points in the display region.

17. An image display system comprising:
an image distribution apparatus for distributing a wide-angle image having one or more attention points; and
a terminal apparatus for displaying the wide-angle image, the terminal apparatus including circuitry configured to:
detect a predetermined trigger in a case that at least a part of the wide-angle image is displayed as a display region;
in response to detecting the predetermined trigger, display a first region of the wide-angle image in the display region, the first region including at least one of the one or more attention points;
record an attention point that has been displayed from among the one or more attention points; and
in a case that no attention point is included in the display region, display a second region of the wide-angle image in the display region, the second region including a particular attention point that has not yet been displayed.

18. An information processing apparatus for displaying a wide-angle image including one or more attention points on a display device, the information processing apparatus comprising:
circuitry configured to:
detecting detect a predetermined trigger in a case that at least a part of the wide-angle image is displayed as a display region;
in response to detecting the predetermined trigger, display a first region of the wide-angle image in the display region, the first region including at least one of the one or more attention points;
record an attention point that has been displayed from among the one or more attention points, and
in a case that no attention point is included in the display region, display a second region of the wide-angle image in the display region, the second region including a particular attention point that has not yet been displayed.

* * * * *